US011024112B2

(12) United States Patent
Amaitis et al.

(10) Patent No.: US 11,024,112 B2
(45) Date of Patent: Jun. 1, 2021

(54) SYSTEM AND METHOD FOR SLOT MACHINE GAME ASSOCIATED WITH FINANCIAL MARKET INDICATORS

(71) Applicant: CFPH, LLC, New York, NY (US)

(72) Inventors: Lee Amaitis, Palm Beach Gardens, FL (US); James C. Johnson, Ridgewood, NJ (US)

(73) Assignee: CFPH, LLC, New York, NY (US)

( * ) Notice: Subject to any disclaimer, the term of this patent is extended or adjusted under 35 U.S.C. 154(b) by 4 days.

(21) Appl. No.: 16/416,495

(22) Filed: May 20, 2019

(65) Prior Publication Data

US 2019/0272700 A1 Sep. 5, 2019

Related U.S. Application Data

(63) Continuation of application No. 11/963,088, filed on Dec. 21, 2007, now Pat. No. 10,332,332.

(51) Int. Cl.
*A63F 13/00* (2014.01)
*G07F 17/32* (2006.01)
*G07F 17/34* (2006.01)

(52) U.S. Cl.
CPC .......... *G07F 17/32* (2013.01); *G07F 17/3227* (2013.01); *G07F 17/3244* (2013.01); *G07F 17/3262* (2013.01); *G07F 17/34* (2013.01)

(58) Field of Classification Search
CPC .. G07F 17/3288; G07F 17/34; G07F 17/3262; G07F 17/3213
See application file for complete search history.

(56) References Cited

U.S. PATENT DOCUMENTS

| | | | |
|---|---|---|---|
| 4,248,458 | A | 2/1981 | Brody |
| 4,288,077 | A | 9/1981 | Rose et al. |
| 4,540,174 | A | 9/1985 | Coppock |
| 4,569,526 | A | 2/1986 | Hamilton |
| 4,666,160 | A | 5/1987 | Hamilton |
| 4,695,053 | A | 9/1987 | Vazquez, Jr. et al. |
| 4,817,951 | A | 4/1989 | Crouch et al. |
| 4,856,788 | A | 8/1989 | Fischel |
| 4,874,177 | A | 10/1989 | Girardin |
| 4,883,636 | A | 11/1989 | Fantle, Jr. |
| 4,935,748 | A | 6/1990 | Schmidt et al. |
| 4,962,950 | A | 10/1990 | Champion |
| 5,102,137 | A | 4/1992 | Ekiert |
| 5,518,239 | A | 5/1996 | Johnston |
| 5,524,888 | A | 6/1996 | Heidel |
| 5,586,937 | A | 12/1996 | Menashe |

(Continued)

FOREIGN PATENT DOCUMENTS

| | | |
|---|---|---|
| EP | 1 139245 | 10/2001 |
| EP | 1 234606 | 8/2002 |

(Continued)

OTHER PUBLICATIONS

U.S. Appl. No. 11/018,978, filed Dec. 2004, Amaitis et al.

(Continued)

*Primary Examiner* — Omkar A Deodhar
*Assistant Examiner* — Eric M Thomas

(57) ABSTRACT

System and methods related to wagering, such as slot machines and/or other electronic games. Some wagering may relate to market indicators, market lines, and/or stop commands.

13 Claims, 9 Drawing Sheets

(56) References Cited

U.S. PATENT DOCUMENTS 5,683,090 A 11/1997 Zeile et al.
5,709,603 A 1/1998 Kaye
5,713,793 A 2/1998 Holte
5,722,890 A 3/1998 Libby et al.
5,743,525 A 4/1998 Haddad
5,749,785 A 5/1998 Rossides
5,782,470 A 7/1998 Langan
5,851,010 A 12/1998 Feinberg
5,888,136 A 3/1999 Herbert
6,001,016 A 12/1999 Walker et al.
6,024,641 A 2/2000 Sarno
6,026,383 A 2/2000 Ausubel
6,038,554 A 3/2000 Vig
6,062,979 A 5/2000 Inoue
6,095,051 A 8/2000 Lupien et al.
6,102,797 A 8/2000 Kail
6,110,042 A 8/2000 Walker et al.
6,113,492 A 9/2000 Walker et al.
6,120,376 A 9/2000 Cherry
6,126,543 A 10/2000 Friedman
6,135,881 A 10/2000 Abbott et al.
6,152,822 A 11/2000 Herbert
6,157,918 A 12/2000 Shepherd
6,193,605 B1 2/2001 Libby et al.
6,296,569 B1 10/2001 Congello, Jr.
6,309,307 B1 10/2001 Krause et al.
6,321,212 B1 11/2001 Lange
6,325,721 B1 12/2001 Miyamoto et al.
6,331,148 B1 12/2001 Krause et al.
6,343,988 B1 2/2002 Walker et al.
6,358,150 B1 3/2002 Mir et al.
6,394,899 B1 5/2002 Walker
6,421,653 B1 7/2002 May
6,450,887 B1 9/2002 Mir et al.
6,527,270 B2 3/2003 Maksymec et al.
6,547,242 B1 4/2003 Sugiyama et al.
6,558,255 B2 5/2003 Walker et al.
6,616,529 B1 9/2003 Qian et al.
6,624,641 B1 9/2003 Krampitz et al.
6,656,042 B2 12/2003 Reiss et al.
6,663,107 B2 12/2003 Fisher et al.
6,666,769 B2 12/2003 Stronach
6,676,510 B1 1/2004 Bittman
6,688,978 B1 2/2004 Herman
6,709,330 B1 3/2004 Klein et al.
6,869,360 B2 3/2005 Marks et al.
6,875,104 B2 4/2005 Hara
6,910,965 B2 6/2005 Downes
7,040,982 B1 5/2006 Jarvis et al.
7,094,151 B2 8/2006 Downes
7,155,409 B1 12/2006 Stroh et al.
7,160,189 B2 1/2007 Walker et al.
7,206,762 B2 4/2007 Sireau
7,233,922 B2 6/2007 Asher et al.
7,302,412 B1 11/2007 Speck
7,458,891 B2 12/2008 Asher et al.
7,566,268 B2 7/2009 Asher et al.
7,566,270 B2 7/2009 Amaitis et al.
7,604,537 B2 10/2009 Amaitis et al.
7,637,807 B2 12/2009 Asher et al.
7,693,781 B2 4/2010 Asher et al.
7,708,636 B2 5/2010 Asher et al.
7,711,628 B2 5/2010 Davie et al.
7,789,754 B2 9/2010 Asher et al.
7,835,961 B2 11/2010 Davie et al.
7,962,400 B2 6/2011 Amaitis et al.
8,460,085 B2 6/2013 Alderucci et al.
8,535,140 B2 9/2013 Alderucci et al.
8,684,814 B2 4/2014 Amaitis et al.
8,758,108 B2 6/2014 Amaitis et al.
8,968,078 B2 3/2015 Amaitis et al.
9,230,407 B2 1/2016 Amaitis et al.
9,293,004 B2 3/2016 Alderucci et al.
9,293,009 B2 3/2016 Asher et al.
9,355,527 B2 5/2016 Amaitis et al.
9,355,537 B2 5/2016 Amaitis et al.
9,536,395 B2 1/2017 Alderucci et al.
10,249,149 B2 4/2019 Asher et al.
10,654,280 B2 5/2020 Cowger et al.
10,794,666 B2 10/2020 Akgun
10,794,668 B2 10/2020 Joosen et al.
10,795,163 B2 10/2020 Wang et al.
10,836,077 B2 11/2020 Andrews
10,836,958 B2 11/2020 Nakamura et al.
10,836,975 B2 11/2020 Takahashi et al.
10,836,999 B2 11/2020 Campana et al.
2001/0032169 A1 10/2001 Sireau
2001/0039209 A1 11/2001 DeWeese et al.
2002/0032644 A1 3/2002 Corby et al.
2002/0073021 A1 6/2002 Ginsberg et al.
2002/0087447 A1 7/2002 McDonald et al.
2002/0115488 A1 8/2002 Berry et al.
2002/0142816 A1 10/2002 Stronach
2002/0142820 A1 10/2002 Bartlett
2002/0147047 A1 10/2002 Letovsky et al.
2002/0151340 A1 10/2002 Guinn et al.
2002/0151363 A1 10/2002 Letovsky et al.
2002/0183105 A1* 12/2002 Cannon ............... G07F 17/3267
463/16
2002/0198044 A1 12/2002 Walker et al.
2002/0198052 A1 12/2002 Soltys et al.
2003/0046218 A1 3/2003 Albanese et al.
2003/0054875 A1 3/2003 Marks et al.
2003/0109300 A1 6/2003 Walker et al.
2003/0157976 A1 8/2003 Simon et al.
2003/0178775 A1 9/2003 Fisher et al.
2003/0182214 A1 9/2003 Taylor et al.
2003/0182224 A1 9/2003 Horrigan et al.
2003/0190941 A1 10/2003 Byrne
2003/0195029 A1 10/2003 Frohm et al.
2003/0195841 A1 10/2003 Ginsberg et al.
2003/0199315 A1 10/2003 Downes
2003/0216170 A1 11/2003 Walker et al.
2003/0220134 A1 11/2003 Walker et al.
2003/0224847 A1 12/2003 Jaimet
2004/0009812 A1 1/2004 Scott
2004/0029627 A1 2/2004 Hannan et al.
2004/0048656 A1 3/2004 Krynicky
2004/0059666 A1 3/2004 Waelbroeck et al.
2004/0085447 A1* 5/2004 Katta ..................... H04N 7/181
348/143
2004/0102242 A1 5/2004 Poelmann
2004/0111358 A1 6/2004 Lange et al.
2004/0127281 A1 7/2004 Fong
2004/0133495 A1 7/2004 Bosch
2004/0166918 A1 8/2004 Walker et al.
2004/0166942 A1 8/2004 Muir
2004/0176159 A1 9/2004 Walker et al.
2004/0176994 A1 9/2004 Fine et al.
2004/0177023 A1 9/2004 Krowas et al.
2004/0204229 A1 10/2004 Walker et al.
2004/0204232 A1 10/2004 Asher et al.
2004/0210507 A1 10/2004 Asher et al.
2004/0210511 A1 10/2004 Waelbroeck et al.
2004/0214629 A1 10/2004 Walker et al.
2004/0224770 A1 11/2004 Wolf et al.
2004/0235542 A1 11/2004 Stronach et al.
2005/0026670 A1 2/2005 Lardie
2005/0027643 A1 2/2005 Amaitis et al.
2005/0043078 A1 2/2005 Sundstrom
2005/0049033 A1 3/2005 Kojima
2005/0049038 A1 3/2005 Cuddy et al.
2005/0059467 A1 3/2005 Saffari et al.
2005/0075963 A1 4/2005 Balabon
2005/0085288 A1 4/2005 Schugar et al.
2005/0091142 A1 4/2005 Renton et al.
2005/0119962 A1 6/2005 Bowen et al.
2005/0171891 A1 8/2005 Daley et al.
2005/0197938 A1 9/2005 Davie et al.
2005/0197939 A1 9/2005 Davie et al.
2005/0197948 A1 9/2005 Davie et al.
2005/0208996 A1 9/2005 Friedman
2005/0245306 A1 11/2005 Asher et al.
2005/0245308 A1 11/2005 Amaitis et al.

(56) References Cited

U.S. PATENT DOCUMENTS

| | | | | |
|---|---|---|---|---|
| 2005/0245310 | A1 | 11/2005 | Amaitis et al. | |
| 2006/0026090 | A1 | 2/2006 | Balabon | |
| 2006/0031157 | A1 | 2/2006 | Gianakouros et al. | |
| 2006/0105839 | A1 | 5/2006 | Graeve et al. | |
| 2006/0105840 | A1 | 5/2006 | Graeve | |
| 2006/0199631 | A1 | 9/2006 | McGill et al. | |
| 2006/0209190 | A1* | 9/2006 | Walters .................. | H04N 7/181 348/148 |
| 2007/0055607 | A1 | 3/2007 | Wunsch et al. | |
| 2007/0060322 | A1 | 3/2007 | Benrus | |
| 2007/0111777 | A1 | 5/2007 | Amaitis et al. | |
| 2007/0117624 | A1 | 5/2007 | Amaitis et al. | |
| 2007/0123336 | A1 | 5/2007 | Amaitis et al. | |
| 2007/0129138 | A1 | 6/2007 | Amaitis et al. | |
| 2007/0184888 | A1 | 8/2007 | Asher et al. | |
| 2007/0184892 | A1 | 8/2007 | Asher et al. | |
| 2007/0187889 | A1 | 8/2007 | Asher et al. | |
| 2007/0191085 | A1 | 8/2007 | Asher et al. | |
| 2007/0207849 | A1 | 9/2007 | Asher et al. | |
| 2007/0208642 | A1 | 9/2007 | Asher et al. | |
| 2007/0288342 | A1 | 12/2007 | Maclin et al. | |
| 2008/0004116 | A1 | 1/2008 | Van Luchene et al. | |
| 2008/0021803 | A1 | 1/2008 | Ahles et al. | |
| 2008/0032778 | A1 | 2/2008 | Amaitis et al. | |
| 2008/0064499 | A1 | 3/2008 | Grant | |
| 2008/0214274 | A1 | 9/2008 | Thomas et al. | |
| 2009/0163265 | A1 | 6/2009 | Amaitis et al. | |
| 2009/0163266 | A1 | 6/2009 | Amaitis et al. | |
| 2009/0209312 | A1 | 8/2009 | Alderucci et al. | |
| 2009/0209321 | A1 | 8/2009 | Alderucci et al. | |
| 2009/0221357 | A1 | 9/2009 | Amaitis et al. | |
| 2010/0041463 | A1 | 2/2010 | Amaitis et al. | |
| 2014/0302910 | A1 | 10/2014 | Amaitis et al. | |
| 2016/0117891 | A1 | 4/2016 | Amaitis et al. | |
| 2016/0371918 | A1 | 12/2016 | Alderucci | |
| 2017/0109976 | A1 | 4/2017 | Alderucci et al. | |
| 2018/0012443 | A1 | 1/2018 | Alderucci et al. | |

FOREIGN PATENT DOCUMENTS

| | | | |
|---|---|---|---|
| GB | 1574447 | | 9/1980 |
| GB | 2180675 | | 4/1987 |
| GB | 2299425 | | 10/1996 |
| JP | 4-97765 | | 3/1992 |
| JP | 2001-523869 | | 11/2001 |
| JP | 2002-041809 | | 2/2002 |
| JP | 2002-159624 | | 6/2002 |
| JP | 2002-329115 | | 11/2002 |
| JP | 2003-502780 | | 1/2003 |
| JP | 2006-509308 | | 3/2006 |
| JP | 2007-510225 | | 4/2007 |
| JP | 6381462 | | 8/2018 |
| WO | WO 98/04991 | | 2/1998 |
| WO | WO 99/26204 | | 5/1999 |
| WO | WO 99/60498 | | 11/1999 |
| WO | WO 00/79442 | | 12/2000 |
| WO | WO 01/50831 | | 7/2001 |
| WO | WO 01/77964 | A2 | 10/2001 |
| WO | WO 01/86532 | | 11/2001 |
| WO | WO 2004/057440 | | 7/2004 |
| WO | WO 2004/079671 | A2 | 9/2004 |
| WO | WO 2005/045613 | | 5/2005 |
| WO | WO 2005/065065 | A2 | 7/2005 |

OTHER PUBLICATIONS

U.S. Appl. No. 11/623,901, filed Jan. 2007, Asher et al.
U.S. Appl. No. 11/623,908, filed Jan. 2007, Asher et al.
U.S. Appl. No. 11/623,933, filed Jan. 2007, Asher et al.
U.S. Appl. No. 11/623,943, filed Jan. 2007, Asher et al.
U.S. Appl. No. 11/745,573, filed May 2007, Asher et al.
U.S. Appl. No. 11/745,646, filed May 2007, Asher et al.
U.S. Appl. No. 11/841,049, filed Aug. 2007, Amaitis et al.
U.S. Appl. No. 11/963,088, filed Dec. 2007, Amaitis et al.
U.S. Appl. No. 11/963,158, filed Dec. 2007, Amaitis et al.
U.S. Appl. No. 12/032,141, filed Feb. 2008, Alderucci etal.
U.S. Appl. No. 12/032,160, filed Feb. 2008, Alderucci etal.
U.S. Appl. No. 12/463,549, filed May 2009, Amaitis et al.
U.S. Appl. No. 12/603,162, filed Oct. 2009, Amaitis et al.
Random Walk Theory; http://www.streetauthority.com/tenns/r/random-walk-theory.asp; 3 pages; date unknown.
Welcome to binarybet.com; binarybet.com; 1 page; Date: 2003.
What is a Binary Bet?; binarybet.com; 1 page; Date: 2003.
Frequently Asked Questions; binarybet.com; 1 page; Date: 2003.
Fixed Odds Financial Betting; http://web.archive.org/web/20020329110541/http://betonmarkets.corn/; 2 pages; May 10, 2005.
Notification of Transmittal of the International Search Report and the Written Opinion of the International Searching Authority for International Application No. PCT/US2005/006853; 13 pages, dated May 10, 2005.
Notification of Transmittal of the International Search Report and the Written Opinion of the International Searching Authority for International Application No. PCT/US05/15129; 8 pages; dated May 28, 2008.
"NTRA All Star Jockey Championship Special Wagers," 3 pages, Date: at latest Apr. 29, 2004.
Wagering Information: Straight or Basic Wagers; Lone Star Park at Grand Prairie: Player's Guide; http://www.lonestarpark.com/bet info.asp; 3 pages; Date Unknown.
Wagering Information: Straight or Basic Wagers; NTRA.com, http://www.ntra.com/news.asp?type=playthehorses&id=4799; 3 pages; Date Unknown.
Glossary of Terms; NTRA.com; http://www.ntra.com/news.asp?type=playthehorses&id=4797; 4 pages; Date Unknown.
The Basics of Horseplay; NTRA.com; http://www.ntra.com/news.asp?type=playthehorses&id=4795; 2 pages; Date Unknown.
Ozgit, A.; Performance Based Sports Derivatives: A New Instrument; Chapter 3; pp. 83-121. Date Unknown.
Sauer, Raymond D.; The Economics of Wagering Markets; Journal of Economic Literature; vol. 36, No. 4; pp. 2021-2064; Date: Dec. 1998.
Bet with the People Who Know Racing; Racing Daily Forum; 15 pages; Date: Jul. 24, 2001.
Quote of the Day; Bet of the Day; London Times; 1 page; Date: Jul. 30, 2003.
The Patent Office Search Report for International Application No. GB 0320232.2; 6 pages; Date:Dec. 17, 2003.
TradeSports Trading & Betting Exchange, Best Lines & Bonuses, What is Tradesports?; www.tradesports.com; 2 pages; Date: Apr. 27, 2004.
Savage, Sam L.: Prices, Probabilities and Predictions; ORIMS Today; 10 pages; Date: Jun. 2004.
Notification of Transmittal of the International Search Report and the Written Opinion of the International Searching Authority for International Application No. PCT/US05/46927; 9 pages; dated Jun. 19, 2006.
Notification of Transmittal of the International Search Report and the Written Opinion of the International Searching Authority for International Application No. PCT/US04/10028; 6 pages; dated Jun. 23, 2006.
Notification of Transmittal of the International Search Report and the Written Opinion of the International Searching Authority for International Application No. PCT/US05/15001; 10 pages; dated Sep. 13, 2007.
Marshall Fey, "Slot Machines, a Pictorial History of the First 100 Years", Fifth Edition, Liberty Belle Books, 1983, pp. 59-60 & 168.
Notification of Transmittal of the International Search Report and the Written Opinion of the International Searching Authority, or the Declaration for International Application No. PCT/US05/14667; 11 pages; dated Mar. 30, 2007.
Notification of Transmittal of the International Search Report and Written Opinion for International Application No. PCT/US05/15004, 6 pages; dated Jun. 14, 2006.
Random House Unabridged Dictionary, Copyright 1997, Random House Inc. on Infoplease, <http://dictionary.infoplease.com/formula>.

(56) References Cited

OTHER PUBLICATIONS

EPO Communication dated Jan. 15, 2010 forwarding Supplementary European Search Report for Application No. EP 05741231.4, dated Dec. 22, 2009 (2 pages).
EPO Communication dated Jan. 27, 2010 forwarding Supplementary European Search Report for Application No. EP 05744471.3, dated Jan. 15, 2010 (3 pages).
Australian Examiner's Report for Application No. 2005240605, dated Jun. 8, 2010 (2 pages).
EPO Communication and Exam Report for Application No. 05741231.4, dated Aug. 13, 2010 (5 pages).
Japanese Office Action with English translation for Application No. 2007-510986, dated May 25, 2010 (9 pages).
Japanese Office Action with English translation for Application No. 2007-511082, dated Jul. 13, 2010 (21 pages).
Japanese Office Action with English translation for Application No. 2007-548561, dated Sep. 7, 2010 (11 pages).
European Communication and extended European Search Report for Application No. 05855479.1, dated Sep. 24, 2010 (6 pages).
Australian Exam Report for Application No. 2005319039, dated Jul. 28, 2010 (2 pages).
AU Examination Report for Application No. 2005240588, dated Jun. 4, 2010 (2 pages).
EP Office Action for Application No. 05740565.4, dated Jun. 9, 2010 (4 pages).
Japanese Office Action with English translation for Application No. 2007-511050, dated May 25, 2010 (9 pages).
EP Office Action for Application No. 05744471.3 dated Jun. 16, 2010 (5 pages).
AU Examination Report for Application No. 2005241445, dated Jun. 8, 2010 (2 pages).
Japanese Office Action with English translation for Application No. 2007-511082, dated Jan. 18, 2011 (4 pages).
Australian Notice of Acceptance for Application No. 2005240605, dated Jun. 22, 2011 (3 pages).
Japanese Office Action with English translation for Application No. 2007-510986, dated Apr. 12, 2011 (5 pages).
Japanese Official Questioning with English translation for Application No. 2007-511082, dated Aug. 9, 2011 (8 pages).
EPO Decision to Refuse for Application No. 05741231.4, dated Jan. 18, 2012 (4 pages).
Australian Notice of Acceptance for Application No. 2005319039, dated May 1, 2012 (3 pages).
Australian Exam Report for Application No. 2011232768, dated May 21, 2012 (2 pages).
Australian Exam Report for Application No. 2005241445, dated Mar. 7, 2012 (2 pages).
Canadian Exam Report for Application No. 2,564,301, dated Oct. 19, 2012 (3 pages).
Australian Exam Report for Application No. 2012202392; dated Nov. 16, 2012 (3 pages).
EP Communication Pursuant to Article 94(3) EPC for Application No. 05855479.1; dated Oct. 17, 2012 (6 pages).
JP Office Action for Application No. 2011-111339; dated Sep. 4, 2012; 7 pages.
JP Office Action for Application No. 2011-10393; dated Nov. 20, 2012; 4 pages.
JP Office Action for Application No. 2011-10393; dated May 8, 2012; 4 pages.
JP Office Action for Application No. 2007-510986; dated Aug. 28, 2012; 5 pages.
PCT International Search Report and Written Opinion for Application No. PCT/US2010/021986; dated Mar. 8, 2010; 8 pages.
"Hardware Random Number Generator", Wikipedia.org, Apr. 8, 2013; http://en.wikipedia.org/wiki/Hardware_random_number_generator.
Canadian Exam Report for Application No. 2,564,462, dated Sep. 14, 2012 (3 pages).
Canadian Exam Report for Application No. 2,591,990, dated Feb. 1, 2013 (3 pages).
Japanese Office Action with English translation for Application No. 2011-111339, dated Jun. 4, 2013 (4 pages).
Canadian Exam Report for Application No. 2,564,455, dated Aug. 9, 2013 (3 pages).
Japanese Office Action with English translation for Application No. 2007-511050, dated Apr. 12, 2011 (6 pages).
Canadian Exam Report for Application No. 2,564,301, dated Dec. 23, 2013 (3 pages).
Australian Notice of Acceptance for Application No. 2011232768 dated Feb. 25, 2014, 2 pages.
Canadian Exam Report for Application No. 2,564,462, dated Feb. 28, 2014 (3 pages).
Japanese Office Action with English translation for Application No. 2011-111339 dated Mar. 11, 2014 (6 pages).
Australian Exam Report for Application No. 2012201350 dated Feb. 21, 2014 (3 pages).
Japanese Office Action with English translation for Application No. 2012-285715 dated Mar. 4, 2014 (4 pages).
Canadian Exam Report for App. No. 2,591,990, dated Aug. 4, 2014 (3 pages).
Australian Exam Report for App. No. 2010206571, dated Sep. 4, 2014 (3 pages).
European Communication and Decision to Refuse for Application No. 05855479.1, dated Feb. 18, 2014 (8 pages).
Canadian Exam Report for Application No. 2,564,462, dated Apr. 2, 2015 (4 pages).
Japanese Office Action with English translation for Application No. 2013-251131 dated May 12, 2015, 4 pages.
Canadian Exam Report for Application No. 2,564,455, dated Mar. 3, 2015 (4 pages).
Canadian Exam Report for Application No. 2,564,301, dated Dec. 9, 2014 (7 pages).
Japanese Office Action with English translation for Application No. 2011-548191 dated Jan. 6, 2015, 6 pages.
Australian Exam Report for App. No. 2014213547, dated Aug. 3, 2015 (3 pages).
Canadian Exam Report for Application No. 2,591,990, dated Feb. 12, 2016 (4 pages).
Canadian Exam Report for Application No. 2,564,462, dated Mar. 9, 2016 (4 pages).
Japanese Office Action with English translation for Application No. 2015-048004 dated Apr. 5, 2016, (4 pages).
Australian Exam Report for App. No. 2016210619, dated Aug. 9, 2016 (1 page).
Canadian Exam Report for Application No. 2564301, dated Mar. 3, 2017 (4 pages).
Japanese Office Action with English translation for Application No. 2015-048004 dated Apr. 4, 2017 (6 pages).
Australian Exam Report for App. No. 2015258282, dated Jan. 25, 2017 (2 pages).
Canadian Exam Report for Application No. 2,564,455, dated Apr. 21, 2016 (4 pages).
Canadian Exam Report for Application No. 2,564,455, dated Jun. 5, 2017 (6 pages).
Australian First Exam Report for App. No. 2016210619, dated Aug. 28, 2017 (4 pages).
Canadian Exam Report for Application No. 2564301, dated Oct. 24, 2017 (4 pages).
Canadian Exam Report for Application No. 2591990, dated Oct. 16, 2017 (6 pages).
Japanese Final Office Action with English translation for Application No . 2015-048004 dated Dec. 5, 2017 (4 pages).
Australian Second Exam Report for App. No. 2015258282, dated Jan. 19, 2018 (3 pages).
Canadian Exam Report for Application No. 2564301, dated Dec. 30, 2015 , 6 pages.
Canadian Exam Report for Application No. 2,564,462, dated May 30, 2017, 6 pages.
Canadian Patent Appeal Board Office Action for Application No. 2,564,462, dated Sep. 18, 2018, 6 pages.

(56) References Cited

OTHER PUBLICATIONS

Canadian Exam Report for Application No. 2564301, dated Nov. 5, 2018, 6 pages.

* cited by examiner

SYSTEM AND METHOD FOR SLOT MACHINE GAME ASSOCIATED WITH FINANCIAL MARKET INDICATORS

CROSS-REFERENCES TO RELATED APPLICATIONS

This application is a continuation of U.S. application Ser. No. 11/963,088, filed on Dec. 21, 2007, which is incorporated by reference herein in its entirety.

DETAILED DESCRIPTION OF EXAMPLE EMBODIMENTS OF THE INVENTION

Figure 1:
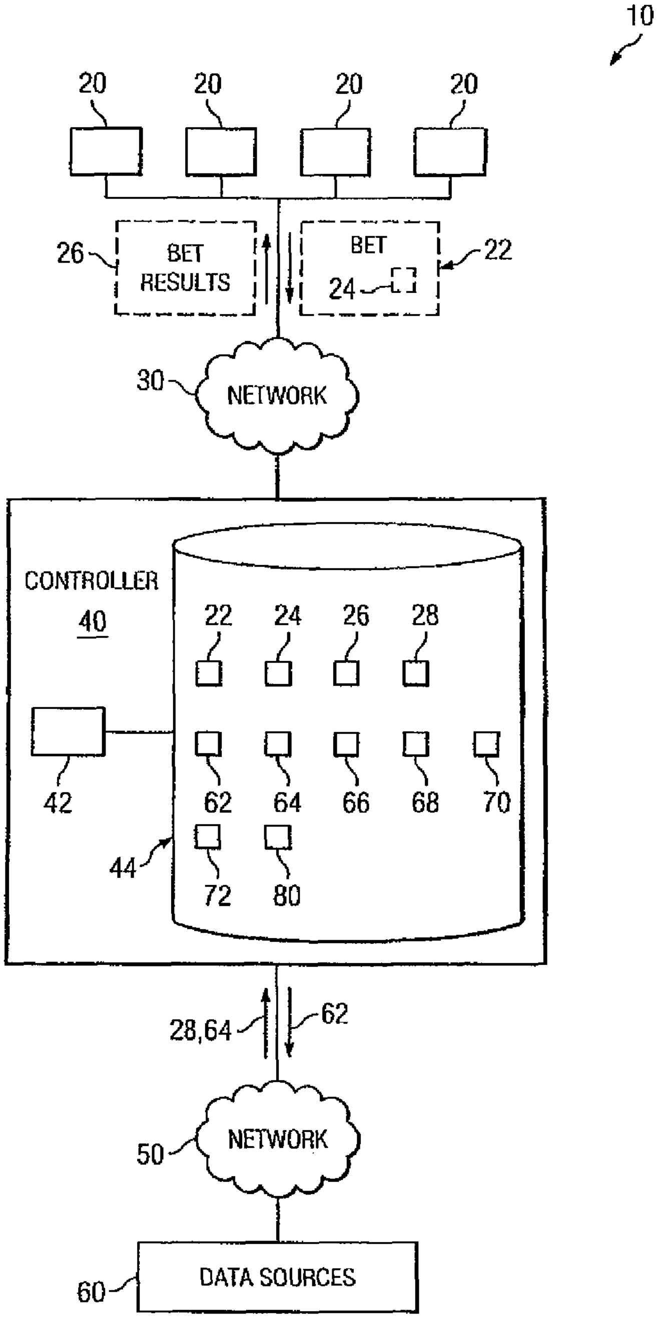
FIG. 1 illustrates an example system for wagering based on financial market indicators in accordance with an embodiment of the present invention.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of" when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be.

For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

The term "facilitating" and like terms may include any action or set of actions which help to bring about a result. Throughout this disclosure, examples of facilitation may be given. Such examples should be interpreted as non-limiting examples only.

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. One or more such computers or computing devices may be referred to as a computer system. The computer system may comprise a plurality of server computers and client computers.

Typically a processor (e.g., one or more microprocessors, one or more microcontrollers, one or more digital signal processors) will receive instructions (e.g., from a memory or like device), and execute those instructions, thereby performing one or more processes defined by those instructions.

Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

A computer system may also include one or more input/output devices. Such input/output devices may include monitors, keyboards, mice, and/or any other desired devices.

Some computer systems may include transmission medium, which may be referred to as a communication network, that couples various internal components of the computer system. Such a communication network may also be referred to in some implementations as a computer bus. Some computer systems may include a specialized input/output device configured to connect to an external communication network. Such a device may be referred to as a network interface. The external communication network may include a LAN and/or the Internet. In some implementations, an edge routing device may operate between a LAN and another network like the Internet. Such a device may include a firewall and/or any other desired security mechanism.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium®, Core, or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Sample Embodiments

Some embodiments of this invention relate generally to gaming systems and methods and, more particularly, to systems and methods for wagering based on one or more financial market indicators.

The rules for playing slot machines can be relatively simple. Generally, a player deposits money and spins the reels. In a physical casino, the player may spin the reels by either pushing a button or yanking on a lever. Reels may spin in any orientation, vertically, horizontally, diagonally, etc. Reels may include virtual or physical embodiments. In an online casino, the player may use a mouse or any suitable computer key to click on the button or lever. A slot machine may have one or more horizontal lines, or paylines, across the window of the slot machine. Such lines, in other embodiments, may be vertical, diagonal, or distributed in a non-line environment, but nonetheless referred to as a line. If a certain combination of symbols falls on a horizontal line when the reels stop, the player may be a winner. Payouts vary by machine and by the number of lines the player chooses to play.

In some slot machines, the combination of symbols that line up on the reels of a slot machine is determined by a Random Number Generator (RNG). This may include a computer program inside the machine that is used to generate a sequence of numbers in milliseconds. Each random number it generates corresponds to a reel combination. Even when a slot machine is not being used, some RNGs keep doing their job of generating numbers. Whatever random number was generated, the split second the player pulled the handle (or hit the "bet one" or "max bet" button) may result in the corresponding reel combinations that appear on the screen. The RNG may not be affected by how much was bet, whether the player pulled the handle or hit the spin button, whether it is the player's first play or last, whether the player is winning or losing, or whether the player is playing with or without a slot card. It just continually generates random numbers. If the player happens to be the lucky player that plays the split second the RNG generates a number corresponding to a jackpot reel combination, the player may be a winner.

In one embodiment, a system comprises a memory operable to store a wager regarding a slot machine game. The system may further comprise a processor coupled to the memory and operable to cause a user interface to display a value of a first financial market indicator. The processor may be further operable to update the displayed value of the first financial market indicator at a predetermined rate. The processor may be further operable to receive a first stop command at a first time. In response to receiving the first stop command, the processor may be further operable to determine a first digit from the displayed value of the first financial market indicator at the first time. The processor may be further operable to determine a second digit from a value of a second financial market indicator. The processor may be further operable to determine an outcome of the wager based at least in part on the determined first digit and the determined second digit.

In another embodiment, a system comprises a memory operable to store an over-under wager associated with a financial market indicator, wherein the over-under wager defines a market line. The system may further comprise a processor coupled to the memory and operable to receive a slot game bet. The processor may be further operable to cause at least one slot reel to stop spinning such that at least one digit is visible on the at least one slot reel. The processor may be further operable to compare the at least one digit with the market line defined by the over-under wager. The processor may be further operable to determine an outcome of the slot game bet based at least in part on the comparison.

According to certain embodiments, a system comprises a memory operable to store a wager regarding a slot machine game. The system may further comprise a processor coupled to the memory and operable to cause a user interface to display a value of a first financial market indicator, wherein the displayed value is updated at a predetermined rate. The processor may be further operable to cause the user interface to display a reel that is spinning. The processor may be further operable to receive a first stop command at a first time. In response to receiving the first stop command, the processor may be further operable to determine a first digit from the displayed value of the first financial market indicator at the first time, stop the displayed reel from spinning, and determine a second digit that is visible on the stopped reel, wherein the determined second digit is displayed at a payline. The processor may be further operable to determine an outcome of the wager based at least in part on the determined first digit and the determined second digit.

In some embodiments, a method for wagering is provided. An example method starts by receiving a bet indicating the value of a multi-digit number. The method continues by determining a first value based at least in part upon the value of a digit of a first financial market indicator, and by determining a second value based at least in part upon the value of a digit of a second financial market indicator. The method proceeds by determining a winning number based at least in part upon the first value and the second value. The method concludes by comparing the winning number against the value of the multi-digit number indicated by the bet, and by determining an outcome of the bet based at least in part upon the comparison.

In other embodiments, another example method for wagering may be provided. The method starts by receiving a bet regarding a spin of the reels of a slot machine. The method continues by determining a first symbol for a first reel of the slot machine based at least in part upon a first value and a second value. The first value is associated with a value of a digit of a first financial market indicator at a first point in time, and the second value is associated with the value of a digit of a second financial market indicator at the first point in time. The method continues by determining a second symbol for a second reel of the slot machine, and by determining a third symbol for a third reel of the slot machine. The method concludes by determining an outcome of the bet based at least in part upon the first symbol, the second symbol, and the third symbol.

Various embodiments may benefit from numerous advantages. It should be noted that one or more embodiments may benefit from some, none, or all of the advantages discussed below. One advantage is that a gaming system may provide bettors with gaming based upon the value of financial market indicators. Thus, a bettor may place a bet, such as a bet regarding the spin of the reels of a slot machine, in which the inputs for the game are determined based on the value of financial market indicators rather than the numbers generated by a Random Number Generator. Another advantage is that when financial market indicators are unavailable, such as on the weekends and holidays when financial markets are typically closed, the system determines inputs for the game based on some other type of non-random but unpredictable event.

Another advantage is that, in some embodiments, the system may provide a slot machine game in which financial market indicators are associated with one or more stop controls (e.g., buttons, etc.). By allowing a user to use stop buttons, the system may give the user the perception that the user's skill or reaction time may affect the outcome of the game. In some embodiments, this perception may be illusory such as, for example, where the values of financial market indicators are updated at a rate that is faster than the typical human reaction time. Nevertheless, this perception may enhance the user's enjoyment of the game.

Another advantage is that, in some embodiments, the system may provide wagers on moving market lines. For example, the system may provide a fixed-odds wager that a financial market indicator will be above or below a defined market line after a configurable period of time. While a user that has placed such a wager waits for the outcome of the wager, the system may permit the user to play a slot machine game that is based at least in part on the defined market line. Thus, the system may increase the wagering opportunities available to a user.

Other advantages may be apparent to one skilled in the art from the description and the appended claims.

FIG. 1 illustrates one embodiment of a system 10 that includes clients 20 coupled to a controller 40 using communication network 30. Controller 40 is further coupled to one or more data sources 60 using communication network 50. In general, system 10 provides for wagering based at least in part upon event information 64, such as market indicators 28.

Figure 2:
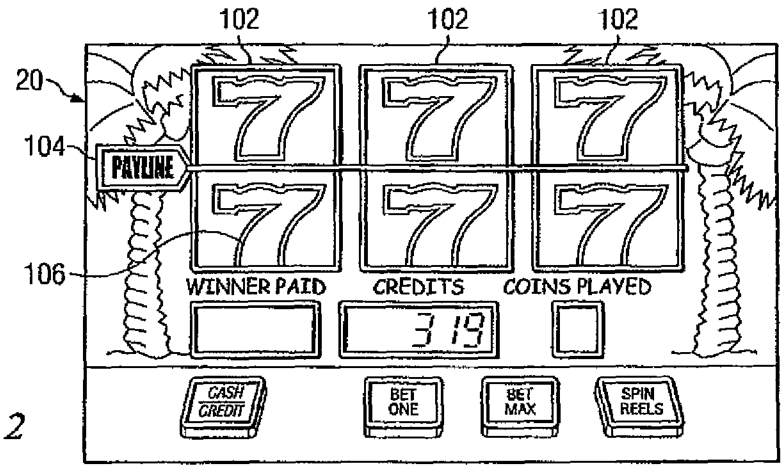
FIG. 2 illustrates one embodiment of a slot machine used with the system of FIG. 1.

Clients 20 are various users of system 10 that may place a bet 22 comprising bet parameters 24 and that may receive bet results 26. Clients 20 may also refer to the devices used by various users of system 10. Examples of these devices include a computer, a personal digital assistant, a mobile phone, a kiosk or point of sale terminal, a Microsoft Surface, or any other device that can interoperate with the elements of system 10 to perform the functions described herein. In a particular embodiment, clients 20 comprise physical slot machines. In other embodiments, clients 20 comprise devices, such as those described above, that can display a virtual slot machine to a user. FIG. 2 illustrates one example of such a slot machine 20.

Referring to FIG. 2, slot machine 20, whether physical or virtual, includes any suitable number of reels 102, paylines 104, and symbols 106. Each reel 102 comprises a cylindrical spinning piece, or virtual display thereof, around which a plurality of symbols 106 are displayed. Each payline 104 comprises a payline 104 (e.g., horizontal, vertical, diagonal, or other) in the visible playing section of the slot machine 20. Each symbol 106 comprises a graphic, picture, alphanumeric character, image, and/or icon that is displayed on reel 102. Symbols 106 may comprise, for example, blanks, cherries, bananas, oranges, diamonds, bells, lemons, numbers, bars, double bars, or any other recognizable images. The more reels 102 that are associated with slot machine 20, the more permutations or possible combinations of symbols 106 are able to appear on the one or more paylines 104. The particular slot machine 20 illustrated in FIG. 2 is only one type of slot machine 20. The look and feel of slot machine 20 could change based on any number of factors associated with system 10, such as the type of data that is used to create the inputs for slot machine 20. For example, if financial information 64 is used, then the look and feel of slot machine 20 (e.g., symbols 106, buttons, display, etc.) may be customized for financial markets.

Referring back to FIG. 1, communication networks 30 and 50 may comprise any suitable number and combination of local area networks, wide area networks (e.g., the Internet), wireless networks, and/or any other type of network that transfers data between controller 40 and the other elements of system 10, such as clients 20 and data sources 60. Although illustrated as two separate networks, all or a portion of networks 30 and 50 may be common to one another. Moreover, all or a portion of communication networks 30 and 50 may be a proprietary network. The transfer of data on network 30 may include the transfer of bets 22 and bet results 26. The transfer of data on network 50 may include a transfer of event data requests 62, such as financial market requests 62, and event information 64, such as financial market information 64.

Controller 40 comprises a processor 42 coupled to a memory 44. Processor 42 may comprise any suitable processor, such as a central processing unit (CPU) or other microprocessor, and may include any suitable number of processors working together. Memory 44 may comprise any suitable combination of volatile and/or non-volatile memory that stores bets 22, bet parameters 24, bet results 26, event data requests 62, event information 64, gaming rules 66, input values 68, input symbols 70 (used interchangeably with symbols 106), payouts 72, and/or wagering system software application 80. Processor 42 may execute application 80 to process bets 22 based at least in part upon event information 64. Although the description detailed below discusses controller 40 performing particular functions, it should be understood that some or all of the functions described as being performed by controller 40 may be performed by clients 20. Functions described may be performed in alternative forms and/or not performed at all in various embodiments.

Data sources 60 comprise any suitable source of real-time or substantially real-time event information 64. For example, data sources 60 may comprise a source of financial market information 64, such as market centers, market data vendors, news services, and the like. Financial market information 64 may comprise information regarding the value, price, volume, and/or any other suitable indicator of a financial market index or any other suitable financial instrument (e.g., stocks, bonds, futures contracts, derivatives, etc.), referred to generally as a market indicator 28, during or at the end of a predetermined period of time or after one or more relevant transactions. The indicators, for example, may indicate a current value of a financial instrument, a range of values of a financial instrument, a rate of change of a value of a financial instrument, a direction of change of value of a financial instrument, a volume of trades of a financial instrument, a measure of liquidity of a financial instrument, a spread of a financial instrument, a bid and/or offer value for a financial instrument, and/or any other information about a financial instrument. For example, market indicator 28 may comprise the value of a certain financial market index, foreign or domestic, such as the Dow Jones Industrial Average (DJIA), the NASDAQ, the Financial Times Stock Exchange (FTSE), the S&P 500, the New York Stock Exchange, or any other suitable financial market index. In another example, market indicator 28 may comprise the value of a particular stock, bond, futures contract, or any other suitable financial instrument. Market indicator 28 may be rounded, such as to the nearest whole point (e.g., market indicator 28 of 9,314.62 may be rounded up to 9,315), and/or include any suitable number of decimal places to provide an appropriate level of granularity. Therefore, each market indicator 28 may comprise a plurality of numerical digits associated with the value of a corresponding financial market index or other financial instrument. As described in greater detail below, controller 40 may determine the outcome of bets 22 based at least in part upon the value of one or more digits that comprise a particular market indicator 28. In some implementations, the values of an indicator may be based on historic data. In some implementations, the values of the indicators may be delayed from a current value (e.g., based on a reporting delay, a communication delay, etc.).

Although the description of system 10 is detailed with reference to financial markets, it should be understood that system 10 provides for the contingency whereby financial markets (and therefore market indicators 28) are unavailable at a given point in time. For example, financial markets may be closed at various times of the day, on weekends, or during holidays so that market indicators 28 are unavailable at these times. In those instances, controller 40 may use event information 64 or any other information from other sources 60 to create inputs for the games, such as a slot machine game. The event information 64 may comprise any suitable numerical data that is not randomly generated but that is also not predictable. For example, the event information 64 may be related to the weather in one or more locations at a particular time; the U.S. national debt at a particular time; power consumption of a city at a particular time; the number of television shows tuned in to a particular channel or program at a particular time (e.g., television ratings); the power output of a facility at a particular time; horse race, dog race, jai alai, or other sporting event results at a particular time; or any other substantially changing numerical data that is related to non-random events. In some embodiments, numerical data for a particular time (e.g., the U.S. national debt for a particular time of a particular day) can be extrapolated or interpolated from available data points.

Slot Machine Game

In operation, controller 40 may receive bet 22 comprising bet parameters 24. In one embodiment, bet 22 comprises a wager regarding a spin of reels 102 of slot machine 20. In another embodiment, bet 22 comprises a wager regarding a "lottery" number. Bet parameters 24 of bet 22 comprise one or more of the identity of client 20 that originated bet 22; the amount of bet 22; the time bet 22 was placed; the type of bet 22 (e.g., slot machine bet, lottery bet, or other type bet); a period of time used to determine the appropriate financial market information 64; a particular digit of a particular market indicator 28 (e.g., first digit, last digit, nth digit); and/or information that identifies one or more financial instruments used to determine the appropriate financial market information 64. In the embodiment where the type of bet 22 comprises a lottery bet 22, bet parameters 24 may further include a multi-digit lottery number. Rather than individual digits, some embodiments may refer to other elements of an indicator, such as a several digits, a direction of movement, etc. An element of an indicator may include any current information and/or historic information about the indicator.

Controller 40 processes bet 22 based at least in part upon financial market information 64. For example, suppose bet 22 specifies the DJIA, the S&P 500, and the NASDAQ as financial market indices to be used to determine the outcome of bet 22. Suppose further that bet 22 specifies that market indicators 28 for these financial market indices should be captured ten seconds after bet 22 is placed, as represented, for example, by a timestamp associated with bet 22 (other bets 22 could indicate that the particular market indicator 28 that is used coincide in time with the timestamp communicated with the particular bet 22). In this example, controller 40 generates a financial market request 62 for the appropriate financial market information 64. In response to financial market request 62, controller 40 receives the following market indicators 28 representing the value of the DJIA, the S&P 500, and the NASDAQ ten seconds after bet 22 was placed: DJIA—10,155; S&P 500-1112; and NASDAQ—1959. Suppose further that bet parameters 24 of bet 22 specified the use of the last digit of each of these market indicators 28 to determine input values 68. Controller 40 therefore determines a first input value 68 of "5" (e.g., the last digit of the market indicator 28 associated with the DJIA); a second input value 68 of "2" (e.g., the last digit of the market indicator 28 associated with the S&P 500); and a third input value 68 of "9" (e.g., the last digit of the market indicator 28 associated with the NASDAQ).

In other examples, input values 68 may be determined based on other digits of market indicator 28 or by applying any suitable mathematical formula that uses one or more digits of one or more market indicators 28 as operands. In still other examples, a second input value 68 may be based at least in part upon a second digit of a first market indicator 28 (e.g., first input value 68 is the $n^{th}$ digit of DJIA and second input value 68 is the $m^{th}$ digit of DJIA).

Controller 40 determines the outcome of bet 22 based upon the first input value 68, the second input value 68, and the third input value 68. For example, suppose that bet 22 comprises a slot machine type bet 22. In this example, controller 40 maps the particular input values 68 to appropriate input symbols 70 for slot machine 20, according to rules 66. In particular, controller 40 maps the first input value 68 to a first input symbol 70 for a first reel 102 of slot machine 20. Controller 40 maps the second input value 68 to a second input symbol 70 for a second reel 102 of slot machine 20. Controller 40 maps the third input value 68 to a third input symbol 70 for a third reel 102 of slot machine 20. The first reel 102, the second reel 102, and the third reel 102 may be arranged in any suitable order in the slot machine 20, so that the ordering of the particular market indicators 28 when applied to reels 102 of slot machine 20 may comprise one of "529," "592," "259," "295," "952," or "925" based upon rules 66 and/or bet parameters 24.

Rules 66 may specify a mapping of numeric digits to particular input symbols 70. For example, rules 66 may specify the following mapping:

"0"=Blank
"1"=Cherry
"2"=Banana
"3"=Orange
"4"=Diamond
"5"=Bell
"6"=Lemon
"7"=Seven
"8"=Bar
"9"=Double Bar Of course, controller 40 may use any suitable mapping of numeric digits to input symbols 70, and the mapping provided above is only an example of one such mapping. Moreover, particular embodiments of system 10 use bonus symbols 70 to create a jackpot. For example, from time to time, any of the numeric digits from "0" to "9" could result in a bonus symbol 70, such as a "$," "+," "#," "£," "¥," etc. If one or more of reels 102 results in bonus symbol 70, then the user wins an enhanced payout 72. For example, if one reel 102 results in a bonus symbol 70, the user may win a higher payout 72 than normal. If two reels 102 result in a bonus symbol 70, the user may win a still higher payout 72. If all three reels 102 result in a bonus symbol 70, the user may win a jackpot payout 72. The occurrence of bonus symbol 70 for any given reel 102 could be based upon predetermined odds. For example, the odds of receiving a bonus symbol 70 for any given reel 102 may be 100-1. The odds of receiving a bonus symbol 70 for two reels 102 would therefore be 1000-1. The odds of receiving a bonus symbol 70 for all three reels 102 would therefore be 1,000,000-1. The respective payouts 72 for each of these results could then be predicated upon the predetermined odds, taking into account a predetermined house advantage. In other embodiments, the successive outcomes of each reel may not be independent so that the odds may not be calculated in such a fashion (e.g., all the outputs of all the reels may be determined by some function of inputs rather than independently). In such embodiments, for example, the odds of the most unlikely outcome could be significantly different than they appear from the number of possible outcomes.

Using the mapping set forth above, controller 40 therefore determines that the spin of reels 102 of slot machine 20 associated with bet 22 resulted in a combination of "Bell," "Banana," and "Double Bar" at payline 104. Controller 40 applies rules 66 to determine bet results 26. That is, controller 40 applies rules 66 to determine whether this combination of symbols 70 results in a "win," a "loss," or a "tie". Controller 40 also applies rules 66 to determine a particular payout 72 based upon the resulting combination of symbols 70 and the amount of bet 22. In this regard, rules 66 include the winning combinations of symbols 70, the payout odds associated therewith, and any other factors used to determine bet result 26 and/or payout 72. Controller 40 communicates bet results 26 and any other data used to display the appropriate symbols 70 on reels 102 of slot machine 20.

Controller 40 may also determine the outcome of bet 22 based upon the first input value 68, the second input value 68, and the third input value 68 if bet 22 comprises a lottery type bet 22. In this example, suppose bet parameters 24 associated with bet 22 specified a multi-digit lottery number of "529" and specified that this number was to be formed using the last digit of the DJIA, S&P 500, and NASDAQ, in that order, ten seconds after bet 22 was placed. Based upon the market indicators 28 described above, controller 40 determines a winning number of "529." In other examples, the winning number may be determined by applying any suitable mathematical formula that uses one or more determined input values 68 (or market indicators 28) as the operands.

Controller 40 may compare the multi-digit lottery number of "529" specified by bet parameters 24 with the winning number "529" determined according to financial market information 64 to determine the outcome of lottery type bet 22. In this example, controller 40 determines that bet 22 "wins." Controller 40 determines an appropriate payout 72 for the winning bet 22 based at least in part upon the amount of bet 22 and/or the payout odds associated with bet 22 as specified by rules 66. For example, with respect to a three-digit lottery type bet 22, rules 66 may specify payout odds of 500-1. Therefore, if the amount of bet 22 was $1, then payout 72 would comprise $500.00.

Figure 3:
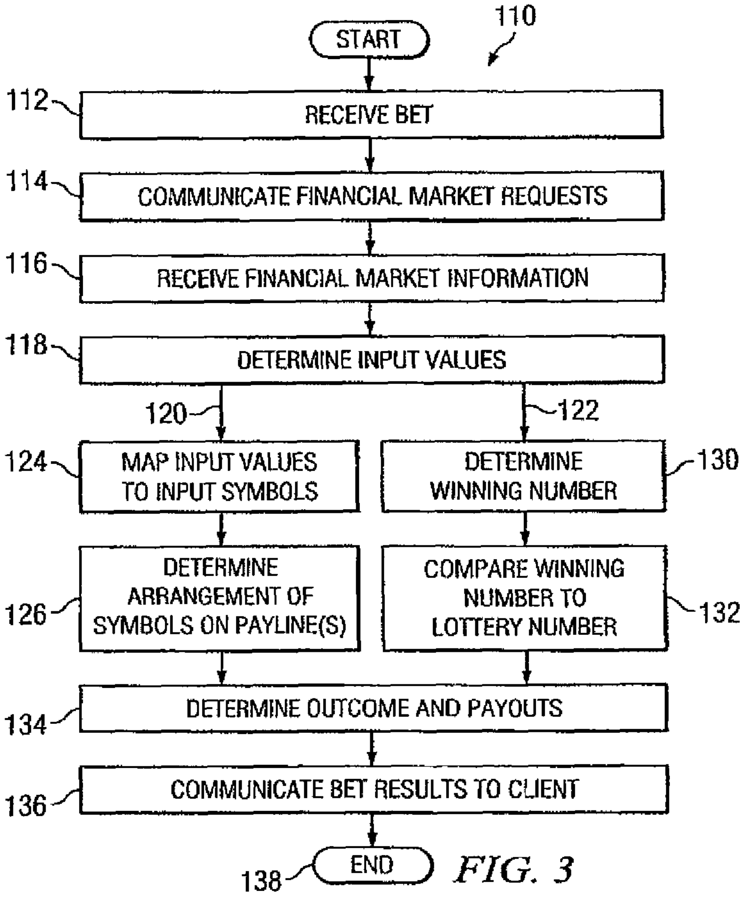
FIG. 3 illustrates a flowchart depicting one example method for wagering based on financial market indicators.

FIG. 3 illustrates a flowchart 110 depicting one example method for wagering based on market indicators 28. At step 112, controller 40 receives bet 22 from client 20. Bet 22 may specify particular financial instruments and a predetermined period of time to be used to determine one or more market indicators 28. For example, bet 22 may specify to capture market indicators 28 for the DJIA, the S&P 500, and the NASDAQ ten seconds after bet 22 is placed. Bet 22 may further specify additional bet parameters 24. Controller 40 communicates appropriate financial market requests 62 at step 114 and receives appropriate financial market information 64 at step 116. In other embodiments, controller 40 may simply capture the appropriate financial market information 64 without issuing any requests 62. In still other embodiments when market indicators 28 are unavailable, controller 40 captures other event information 64 for use in later steps of the method.

Execution proceeds to step 118 where controller 40 determines input values 68 based upon the financial market information 64 received at step 116. Controller 40 may determine any suitable number of input values 68 from any suitable number and combination of market indicators 28 using any suitable techniques described in greater detail above with regard to FIG. 1. From here, execution proceeds along path 120 if bet 22 is a slot machine type bet 22, and along path 122 if bet 22 is a lottery type bet 22. In other embodiments, the ordering may be based on some other indicator or any other desired thing. For example, in some embodiments, the ordering may be based on the value of the indicators, a value range of another indicator, the direction the indicators last moved, and/or any other desired thing.

Proceeding along path 120, controller 40 maps input values 68 determined at step 118 to input symbols 70 at step 124. Controller 40 determines the arrangement of input symbols 70 on the one or more paylines 104 of slot machine 20 at step 126. This arrangement may be based at least in part upon bet parameters 24. For example, bet parameters 24 may dictate that market indicators 28 for the DJIA, the S&P 500, and the NASDAQ should be used in that specific order.

Proceeding along path 122, controller 40 determines the winning number, at step 130, based at least in part upon the particular input values 68 determined at step 118. Controller 40 compares the winning number determined at step 130 to the lottery number specified by bet 22, at step 132.

Whether execution proceeded along path 120 or path 122, execution now proceeds to step 134 where controller 40 determines one or more outcomes of bet 22 and payouts 72. Controller 40 communicates bet results 136 to client 20 at step 136. Execution terminates at step 138.

Slot Machine Game With Symbol Matrix

Figure 4:
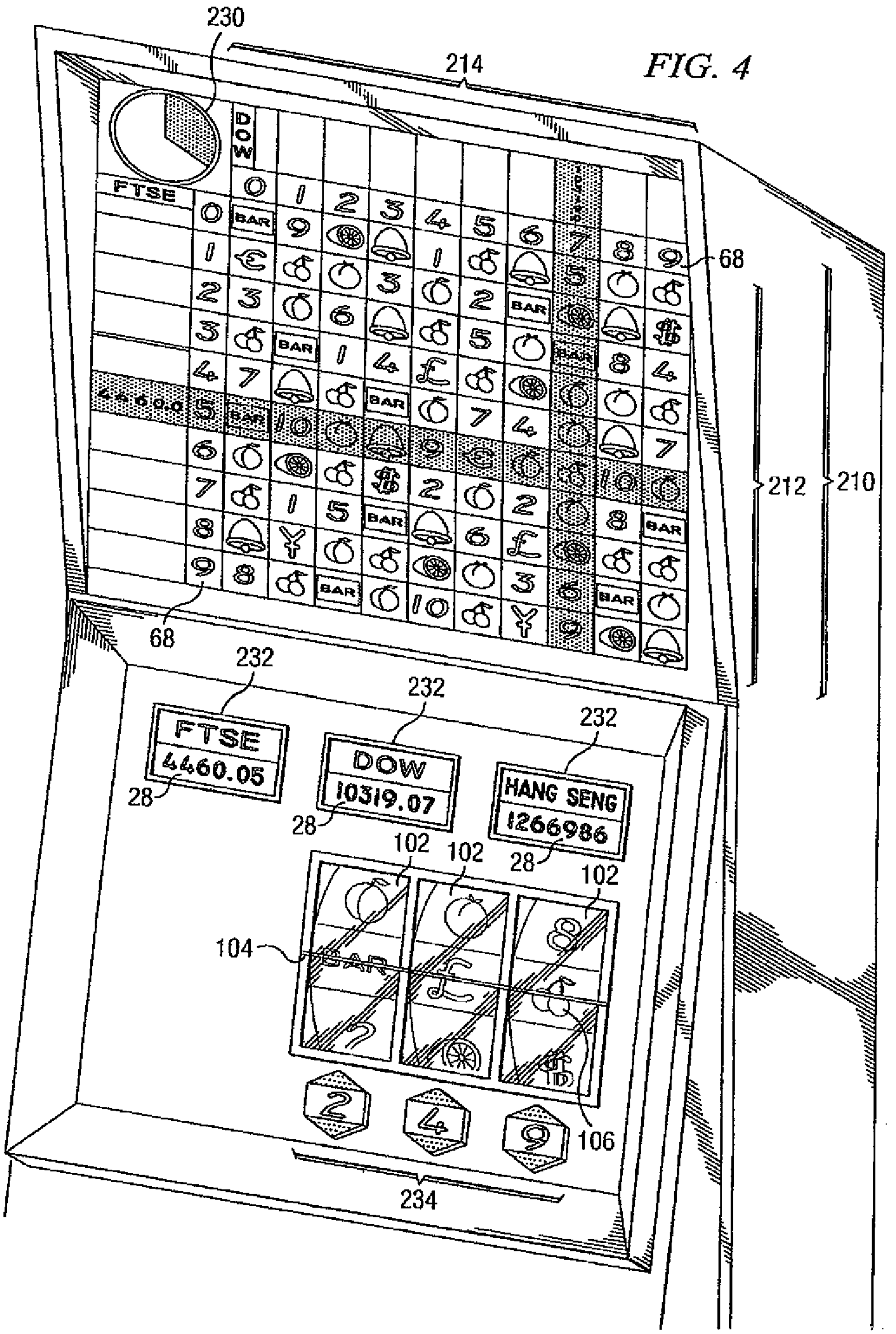
FIG. 4 illustrates another embodiment of a slot machine used with the system of FIG. 1.

FIG. 4 illustrates another embodiment of a slot machine that may be used in system 10. As with the slot machine 20 of FIG. 2, slot machine 200 includes any suitable number of reels 102, paylines 104, and symbols 106. Slot machine 200 further includes a symbol matrix 210. Symbol matrix 210 comprises an n-dimensional array of symbols 106. As illustrated, symbol matrix 210 is a two-dimensional array having rows 212 of symbols 106 that intersect with columns 214 of symbols 106. Rows 212 and columns 214 are associated with input values 68. As described above, input values 68 may be determined according to the values of one or more digits of one or more market indicators 28 at various points in time. Each symbol 106 associated with a particular reel 102 may be determined according to an intersection of rows 212 and columns 214 based at least in part on input values 68. Slot machine 200 further includes a timer 230, input selections 232, and betting windows 234.

In operation, controller 40 receives bet 22 comprising bet parameters 24. In one embodiment, bet 22 comprises a bet regarding a spin of the reels 102 of slot machine 200. Alternatively, or in addition, bet 22 comprises a bet regarding a lottery number selected in betting windows 234. Bet parameters 24 associated with bet 22 comprise one or more of the identity of the particular client 20 that originated bet 22; the amount of bet 22; the time bet 22 was placed; the type of bet 22 (e.g., slot machine bet, lottery bet, or other type bet); one or more periods of time used to determine the appropriate financial market information 64; a particular digit of market indicator 28 (e.g., first digit, last digit, nth digit); and information that identifies one or more financial instruments used to determine the appropriate financial market information 64 (e.g., from input selections 232). In the embodiment where the type of bet 22 comprises a lottery bet 22, bet parameters 24 may further comprise multiple symbols 106 that are selected in betting windows 234. This bet 22 is therefore a bet on the predicted composition of symbols 106 associated with reels 102 of slot machine 200.

Controller 40 processes the received bet 22 based at least in part upon financial market information 64. For example, suppose bet 22 specifies the FTSE and the DJIA as market indicators 28 to be used to determine the outcome of bet 22. Suppose further that bet 22 specifies that these market indicators 28 should be captured ten seconds, twenty seconds, and thirty seconds after the bet 22 is placed, as represented, for example, by a timestamp associated with bet 22. In this example, controller 40 generates a financial market request 62 for the appropriate financial market information 64. In response to the financial market request 62, controller 40 may receive the following market indicators 28 representing the value of the FTSE and the DJIA at the appropriate time intervals specified in the bet:

After ten seconds: FTSE—4,460.10
DJIA—10319.20
After twenty seconds: FTSE—4,460.17
DJIA—10319.26
After thirty seconds: FTSE—4,460.05
DJIA—10,319.07

Suppose further that bet parameters 24 of the received bet 22 specified the use of the last digit of each of these market indicators 28 to determine input values 68 for each time interval of bet 22. For the first time interval of ten seconds after bet 22 is placed, controller 40 therefore determines a first input value 68 of "0" (e.g., the last digit of the market indicator 28 associated with the FTSE), and a second input value 68 of "0" (e.g., the last digit of the market indicator 28 associated with the DJIA). Controller 40 then determines that the intersection of "0" and "0" in the symbol matrix 210 corresponds to the symbol 106 of "BAR". Controller 40 therefore associates the symbol 106 of "BAR" with the first reel 102 of slot machine 200.

For the second time interval of twenty seconds after the bet 22 is placed, controller 20 determines a first input value 68 of "7" (e.g., the last digit of the market indicator 28 associated with the FTSE), and a second input value 68 of "6" (e.g., the last digit of the market indicator 28 associated with the DJIA). Controller 40 then determines that the intersection of "7" and "6" in the symbol matrix 210 corresponds to the symbol 106 of "£". Controller 40 therefore associates the symbol 106 of "£" with the second reel 102 of slot machine 200.

For the third time interval of thirty seconds after bet 22 is placed, controller 20 determines a first input value 68 of "5" (e.g., the last digit of the market indicator 28 associated with the FTSE), and a second input value 68 of "7" (e.g., the last digit of the market indicator 28 associated with the DJIA). Controller 40 then determines that the intersection of "5" and "7" in the symbol matrix 210 corresponds to the symbol 106 of a "Cherry." Controller 40 therefore associates the symbol 106 of a cherry with the third reel 102 of slot machine 200.

Controller 40 therefore determines that the spin of reels 102 of slot machine 200 associated with bet 22 resulted in a combination of "BAR," "£," and "Cherry" at payline 104. Controller 40 applies rules 66 to determine bet results 26 based on this combination of symbols 106. That is, controller 40 applies rules 66 to determine whether this combination of symbols 106 results in a "win," a "loss," or a "tie". Controller 40 also applies rules 66 to determine a particular payout 72 based upon the resulting combination of symbols 106 and the amount of bet 22. In this regard, rules 66 include the winning combinations of symbols 106, the payout odds associated therewith, and any other factors used to determine a bet result 26 and/or payout 72. Controller 40 communicates bet results 26 and any other data used to display the appropriate symbols 106 on reels 102 of slot machine 200 (e.g., as symbols 106).

In other examples, the particular input values 68 may be determined based on other digits of market indicators 28 or by applying any suitable mathematical formula that uses one or more digits of one or more market indicators 28 as operands. In still other examples, the symbols 106 for different reels 102 of slot machine 200 may be derived from different market indicators 28. In particular, referring back to the example above, the symbol 106 for the second reel 102 of slot machine 200 may be derived from the value of a digit of market indicators 28 besides the FTSE and the DJIA. Moreover, the symbol 106 for the second reel 102 of slot machine 200 may be derived from the value of a digit of one or the other of the FTSE and the DJIA in combination with the value of a digit of a market indicator 28 besides the FTSE and the DJIA. In this regard, any suitable combinations of market indicators 28, functions/mappings, and/or digits associated therewith can be used to derive the symbols 106 of the different reels 102 of slot machine 200.

In one embodiment, the symbols 106 of symbol matrix 210 may change until bet 22 is placed, at which time they become fixed. Alternatively, or in addition, the symbols 106 may change in between the various time intervals and become fixed at the expiration of each of the time intervals. For example, symbols 106 in symbol matrix 210 may be constantly changing until bet 22 is placed and the first time interval expires, such as ten seconds after bet 22 is placed. At this point in time, symbols 106 become fixed so that a particular symbol 106 may be determined for the first reel 102 of slot machine 200. Once the symbol 106 for the first reel 102 is determined, symbols 106 in symbol matrix 210 may continue to change until the expiration of the second time interval, such as twenty seconds after bet 22 is placed. At this point in time, symbols 106 in symbol matrix 210 become fixed once again so that a particular symbol 106 may be determined for the second reel 102 of slot machine 200. Once the symbol 106 for the second reel 102 is determined, symbols 106 in symbol matrix 210 may again continue to change until the expiration of the third time interval, such as thirty seconds after bet 22 is placed. At this point in time, symbols 106 in symbol matrix 210 become fixed once again so that a particular symbol 106 may be determined for the third reel 102 of slot machine 200.

Controller 40 may also determine the outcome of a lottery type bet 22. In this example, suppose bet parameters 24 associated with a particular lottery type bet 22 predicted the composition of symbols 106 to be "2," "4," and "9" as illustrated in FIG. 4. Based upon the market indicators 28 described above, and the resulting symbols 106 that appear on payline 104 (e.g., "BAR," "£," and "Cherry"), controller 40 would determine that none of the symbols 106 of the lottery type bet 22 match the symbols 106 appearing in the payline 104. Therefore, controller 40 would determine the lottery type bet 22 to be a "loss." In particular embodiments, the controller 40 could determine the result of bet 22 (e.g., a "win," "loss," or "tie") and payout 72 associated therewith based on the number and type of symbols 106 from bet 22 that match the symbols 106 ultimately appearing in payline 104 of slot machine 200. Payout 72 could further be determined based on the amount of bet 22 and/or the payout odds associated with such a bet 22 as specified by rules 66. In other embodiments, the symbols to appear on the payline may be determined after the payout is determined from a set of symbols that would provide the payout.

Figure 5:
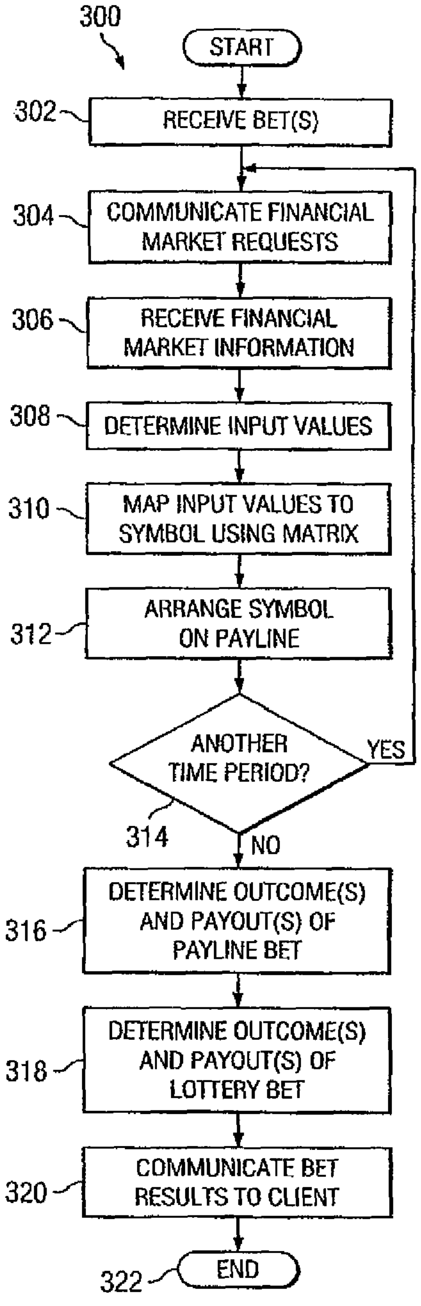
FIG. 5 illustrates a flowchart depicting another example method for wagering based on financial market indicators.

FIG. 5 illustrates a flowchart 300 depicting one example method for wagering based on multiple market indicators 28. At step 302, controller 40 receives bet 22 from client 20. Bet 22 may specify particular bet parameters 24. Controller 40 communicates appropriate financial market requests 62 at step 304 and receives appropriate financial market information 64 at step 306. In other embodiments, controller 40 may simply capture the appropriate financial market information 64 without issuing any requests 62. In still other embodiments when market indicators 28 are unavailable, controller 40 captures other event information 64 for use in later steps of the method.

Execution may proceed to step 308 where controller 40 determines the input values 68 based upon the financial market information 64 received at step 306. Controller 40 may determine any suitable number of input values 68 from any suitable number and combination of market indicators 28 using any suitable techniques described in greater detail above with regard to FIG. 4. At step 310, controller 40 maps input values 68 determined at step 308 to a symbol 106 using matrix 210. Controller 40 arranges the symbol 106 determined at step 310 onto a particular reel 102 at payline 104 at step 312.

If another period of time associated with timer 230 is applicable, as determined at step 314, controller 40 repeats any suitable number and combination of steps 304-312 to determine and arrange another symbol 106 on another reel 102 at payline 104. In some embodiments, one or more of steps 304-308 are performed only once to determine the appropriate input values 68 used to determine the symbols 106 used in steps 310-312. If another period of time is not applicable, as determined at step 314, execution proceeds to step 316 where controller 40 determines the outcome and payout of the bet 22 on payline 104. If a lottery type bet 22 was also placed, execution proceeds to step 318 where controller 40 determines the outcome and payout of the lottery bet 22. The bet results are communicated to the client 20 at step 320 and execution terminates at step 322.

Slot Machine Game With Stop Buttons

Figure 6:
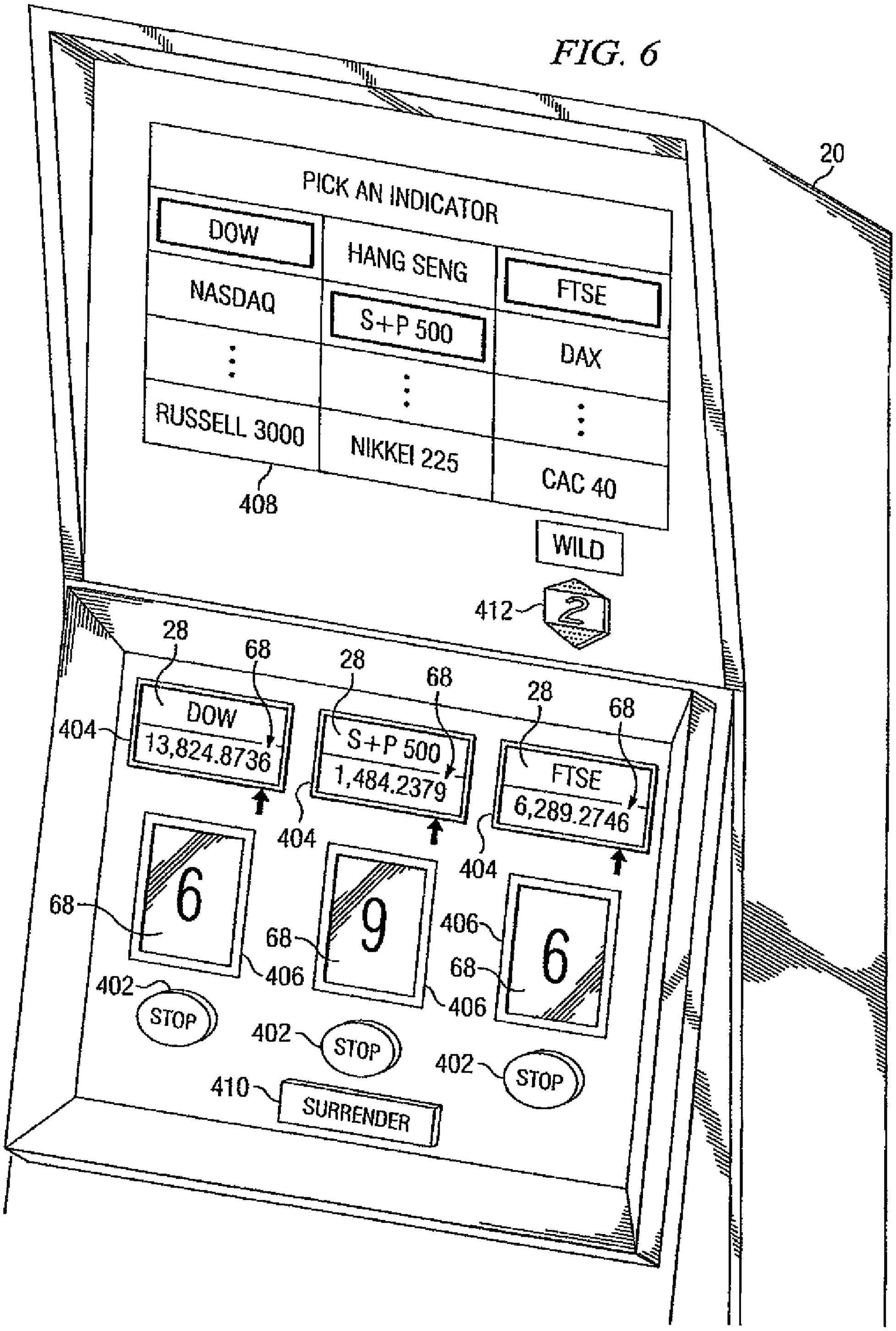
FIG. 6 illustrates a client that provides a slot machine game that comprises one or more stop buttons associated with financial market indicators, according to certain embodiments.

In some embodiments, client 20 may provide a slot machine game that comprises one or more stop buttons 402 associated with market indicators 28. FIG. 6 illustrates client 20 that is operable to provide a game that includes stop buttons 402. In particular, client 20 may comprise one or more indicator frames 404, one or more input frames 406, and one or more stop buttons 402.

Indicator frame 404 generally displays a value of market indicator 28. Client 20 may update the value of market indicator 28 displayed in indicator frame 404 in real time or substantially real time. Thus, as the value of a particular market indicator 28 fluctuates due to changing market conditions, client 20 may update indicator frame 404 to display the current value of market indicator 28. The value of market indicator 28 displayed in indicator frame 404 may be updated at any suitable rate (e.g., one hundred times per second, twenty times per second, etc.). Client 20 may update the value in indicator frame 404 at a rate that is faster or slower than the typical human reaction time. For example, if the typical human reaction time is 0.2 seconds, client 20 may update the value of market indicator 28 in indicator frame 404 at a rate of ten times per second.

In some embodiments, client 20 displays a respective indicator frame 404 for each of a plurality of market indicators 28. Each indicator frame 404 may display the value of a respective market indicator 28. In a given indicator frame 404, the value of market indicator 28 may be rounded to any suitable number of digits. For example, the value of a particular market indicator 28 may be rounded to the ones place, the second decimal place, the fourth decimal place, and/or to any suitable level of granularity. According to certain embodiments, as market conditions change, digits at the more granular levels (e.g., the fourth decimal place) of market indicator 28 may change more frequently than digits at the less granular levels (e.g., the tens place).

In some embodiments, a particular decimal or integral place of market indicator 28 in indicator frame 404 may be designated as input value 68. For example, in the illustrated embodiment, the fourth decimal place in indicator frame 404 is designated as input value 68. It should be understood, however, that any suitable digit of market indicator 28 (e.g., the tens place, the first decimal place, etc.) may be designated as input value 68.

Client 20 may display one or more input frames 406. In some embodiments, each input frame 406 corresponds to a respective indicator frame 404. Input frame 406 generally displays input value 68 from the particular market indicator 28 in the corresponding indicator frame 404. As explained above, client 20 may update the value of market indicator 28 in indicator frame 404 in real time or substantially real time. As market indicator 28 in indicator frame 404 changes, client 20 may update input frame 406 to display the current input value 68.

An example illustrates certain embodiments. In this example, indicator frame 404 displays the current value of the DJIA, which is updated ten times per second. At 10:32:27.3 a.m., indicator frame 404 displays the current value of the DJIA, which is 13,824.8233. In this example, input value 68 is the fourth decimal place of the DJIA. Accordingly, input frame 406 associated with the first indicator frame 404 displays the digit "3". At 10:32:27.4, client 20 updates indicator frame 404 to display the current value of the DJIA, which has changed to 13,824.8736. In conjunction with updating the value of the DJIA in indicator frame 404, client 20 updates input frame 406 to display the digit "6"—the new input value 68 (i.e., digit in the fourth decimal place). Thus, in conjunction with updating market indicator 28 displayed in indicator frame 404, client 20 may update input value 68 displayed in input frame 406.

The components displayed by client 20 may be physical and/or virtual. In some embodiments, client 20 comprises one or more display panels. A display panel of client 20 may be an electronic display and/or a mechanical display such as, for example, a split-flap display. The display panel may be a touch screen, an LCD display, cathode ray tube (CRT) display, plasma display, and/or any suitable display device. The display panel of client 20 is generally operable to display any suitable information associated with a slot machine game.

According to certain embodiments, client 20 comprises one or more stop controls 402. In the illustrated embodiment, the stop controls include stop buttons 402. In some embodiments, each stop button 402 corresponds to a respective input frame 406. In other embodiments, client 20 comprises one stop button 402 for all input frames 406. Stop button 402 may be actuated by a user of client 20. Upon detecting the actuation of stop button 402, client 20 may "freeze" input value 68 displayed in input frame 406. In other words, the actuation of stop button 402 may stop client 20 from further updating the displayed input value 68. Thus, at the moment stop button 402 is actuated, the particular input value 68 that is displayed in input frame 406 may be frozen. In other embodiments, some amount of delay may occur before the symbols are frozen. System 10 may then use the frozen input value 68 to determine the outcome of bet 22. In conjunction with freezing input value 68 in input frame 406, client 20 may freeze the value of market indicator 28 in indicator frame 404 at the moment stop button 402 is actuated.

Stop control 402 may be any suitable input device. In some embodiments, stop control 402 may be a portion of a touch screen display of client 20. Such a display may interpret gestures to determine a stop request. In other embodiments, stop control 402 may be a switch, push button, key, keyboard, keypad, mouse, remote control, and/or any suitable input device. In yet other embodiments, stop control 402 may be a microphone and/or sensor that detects audible signals such as, for example, voice commands. Stop control 402 may be any suitable input device that may be activated by a user to "freeze" input value 68 in input frame 406.

According to certain embodiments, client 20 may display an indicator table 408 to a user. Indicator table 408 may comprise a plurality of market indicators 28. In conjunction with submitting bet 22, a user may select one or more market indicators 28 from indicator table 408. Client 20 may display the selected financial market indicator(s) 28 in indicator frame(s) 404. Thus, a user may select the particular financial market indicator(s) 28 for a given game.

In operation, client 20 receives bet 22 from a user. In some embodiments, client 20 displays indicator table 408 that comprises a plurality of market indicators 28. The user then selects a plurality of market indicators 28 from indicator table 408. Client 20 displays the current value of the first selected market indicator 28 in a first indicator frame 404, the current value of the second selected market indicator 28 in a second indicator frame 404, and so forth.

Client 20 may update, in real time or substantially real time, the values of market indicators 28 in the respective indicator frames 404. A respective decimal or integral place of each indicator frame 404 may be designated as input value 68. For each indicator frame 404, client 20 displays the current input value 68 in a respective input frame 406. As client 20 updates the values of market indicators 28 in indicator frames 404, client 20 updates input values 68 in the corresponding input frames 406.

Client 20 may update market indicators 28 and input values 68 according to any suitable rate. In some embodiments, client 20 updates market indicators 28 and input values 68 at a rate that is faster than the typical human reaction time.

After placing bet 22 and selecting market indicators 28, the user may view the changing input values 68 in input frames 406. The user may freeze input value 68 in a given input frame 406 by actuating stop button 402 corresponding to the given input frame 406. Upon detecting actuation of stop button 402, client 20 may stop the corresponding input value 68 from further changing. By choosing when to depress stop button 402 for each input frame 406, the user may try to obtain a particular combination of digits in input frames 406.

After the user has actuated the respective stop button 402 for each input frame 406, client 20 may determine a payout. The payout may be based at least in part on the combination of digits that are frozen in input frames 406. In some embodiments, the user may receive a first payout if the user stopped input values 68 such that all input frames 406 display the same digit. The user may receive a second payout if the user stopped input values 68 such that two or more input frames 406 (but less than all input frames 406) of client 20 display the same digit. The user may receive a third payout if the displayed digits in input frames 406 represent a "straight." The user may receive a fourth payout if each of the displayed digits in input frames 406 is an even digit or an odd digit. Rules 66 associated with client 20 may specify any suitable payout associated with any suitable combination of digits.

An example illustrates certain embodiments. A user submits bet 22 to client 20, which comprises three indicator frames 404. Client 20 prompts the user to select three market indicators 28 from indicator table 408. In this example, the user selects the DJIA, the S&P 500, and the FTSE. Client 20 then displays the DJIA in the first indicator frame 404, the S&P 500 in the second indicator frame 404, and the FTSE in the third indicator frame 404.

In this example, client 20 updates the values of market indicators 28 in indicator frames 404 at a rate of ten times per second. The fourth decimal place of each market indicator 28 is designated as a respective input value 68. Client 20 displays input value 68 in input frame 406 associated with indicator frame 404. In conjunction with updating market indicators 28 in indicator frames 404, client 20 updates input values 68 in input frames 406. Thus, in the present example, client 20 displays to user input values 68 that (i) are changing at a predetermined rate (i.e., ten times per second) and (ii) are from the selected market indicators 28.

In the present example, client 20 provides a high payout if the user freezes input frames 406 such that each input value 68 is the same. Client 20 provides a medium payout if the user freezes input frames 406 such that two input values 68 are the same. In this example, the user actuates the first stop button 402 when the value of the DJIA that is displayed in the first indicator frame 404 is 13,824.8736. Accordingly, input frame 406 associated with the DJIA is frozen with a value of six (i.e., the digit in the fourth decimal place).

In this example, the user then actuates the second stop button 402 when the value of the S&P 500 that is displayed in the second indicator frame 404 is 1,484.2379. Accordingly, input frame 406 associated with the S&P 500 is frozen with a value of nine (i.e., the digit in the fourth decimal place). The user then actuates the third stop button 402 when the value of the FTSE that is displayed in the third indicator frame 404 is 6,289.2746. Accordingly, input frame 406 associated with the FTSE is frozen with a value of six (i.e., the digit in the fourth decimal place).

Thus, in this example, the game ends with client 20 displaying the following combination of input values 68: six-nine-six. In this example, because two input values 68 are the same (i.e., two sixes), client 20 provides a medium payout to the user.

In the foregoing example, the DJIA, S&P 500, and FTSE are the selected market indicators 28. It should be understood, however, that client 20 may display any suitable number and combination of market indicators 28.

In the foregoing example, input value 68 is the fourth decimal place of market indicator 28. It should be understood, however, that input value 68 may be any suitable decimal or integral place of market indicator 28. It should be further understood that input value 68 for a first market indicator 28 may be associated with a different decimal or integral place than input value 68 for a second market indicator 28.

In some embodiments, each time a reel is determined to be a winning reel, a player may be offered a chance to continue playing an additional reel for a higher payout chance. Some embodiments may have a maximum number of reels. Other embodiments may continue offering additional reels until a player loses. Each additional reel may have a higher payout than a previous reel. Each time a player chooses to play another reel, the player may risk losing some or all winnings won from prior reels for the chance of winning the higher payout.

In some embodiments, client 20 may further comprise a surrender button 410 and a wild frame 412. According to certain embodiments, a user may actuate surrender button 410 to surrender the game prior to actuating all stop buttons 402. By surrendering the game, the user may be refunded a portion of bet 22. In some embodiments, in which additional reels are offered for play after winning earlier reels, a surrender button may be pressed to end play and accept currently accumulated winnings As an example, suppose client 20 comprises three input frames 406. Client 20 may be associated with a payout table that specifies a first payout for three-of-a-kind and a second payout for two-of-a-kind. In this example, the user actuates the first stop button 402 such that the first input frame 406 displays a "3". The user then actuates the second stop button 402 such that the second input frame 406 displays a "7". At this point, the user knows that the result will not be three-of-a-kind. Prior to actuating the third stop button 402, the user may choose to surrender the game and forego the chance of obtaining two-of-a-kind. In some embodiments, if the user surrenders the game, the user may be refunded a portion of bet 22.

According to certain embodiments, client 20 displays a wild frame 412. Wild frame 412 may comprise a digit that is designated as wild. The wild digit may be considered to have whatever value is most favorable to the user. In some embodiments, at the start of the game, the user may select which digit is to be the wild digit.

An example illustrates certain embodiments. Assume that client 20 displays three input frames 406. At the start of a game, the user selects "2" as the wild digit. The user then plays the game. By actuating the respective stop buttons 402, the user freezes input frames 406 such that the following combination is displayed: two-five-five. Because wild frame 412 designates "2" as wild, client 20 determines that the user has obtained a three-of-a-kind. Client 20 then provides an appropriate payout.

In some embodiments, client 20 may comprise a single stop button 402 for all input frames 406. Thus, all of the input frames 406 may be frozen at the particular moment that the user actuates the single stop button 402. In other embodiments, client 20 may not comprise stop button 402. Client 20 may be configured to stop (freeze) each input frame 406 a predetermined amount of time after the user submits bet 22 and/or pulls a lever. For example, client 20 may be configured to freeze each input frame 406 three seconds, five seconds, and/or any suitable amount of time after the user submits bet 22.

Figure 7:
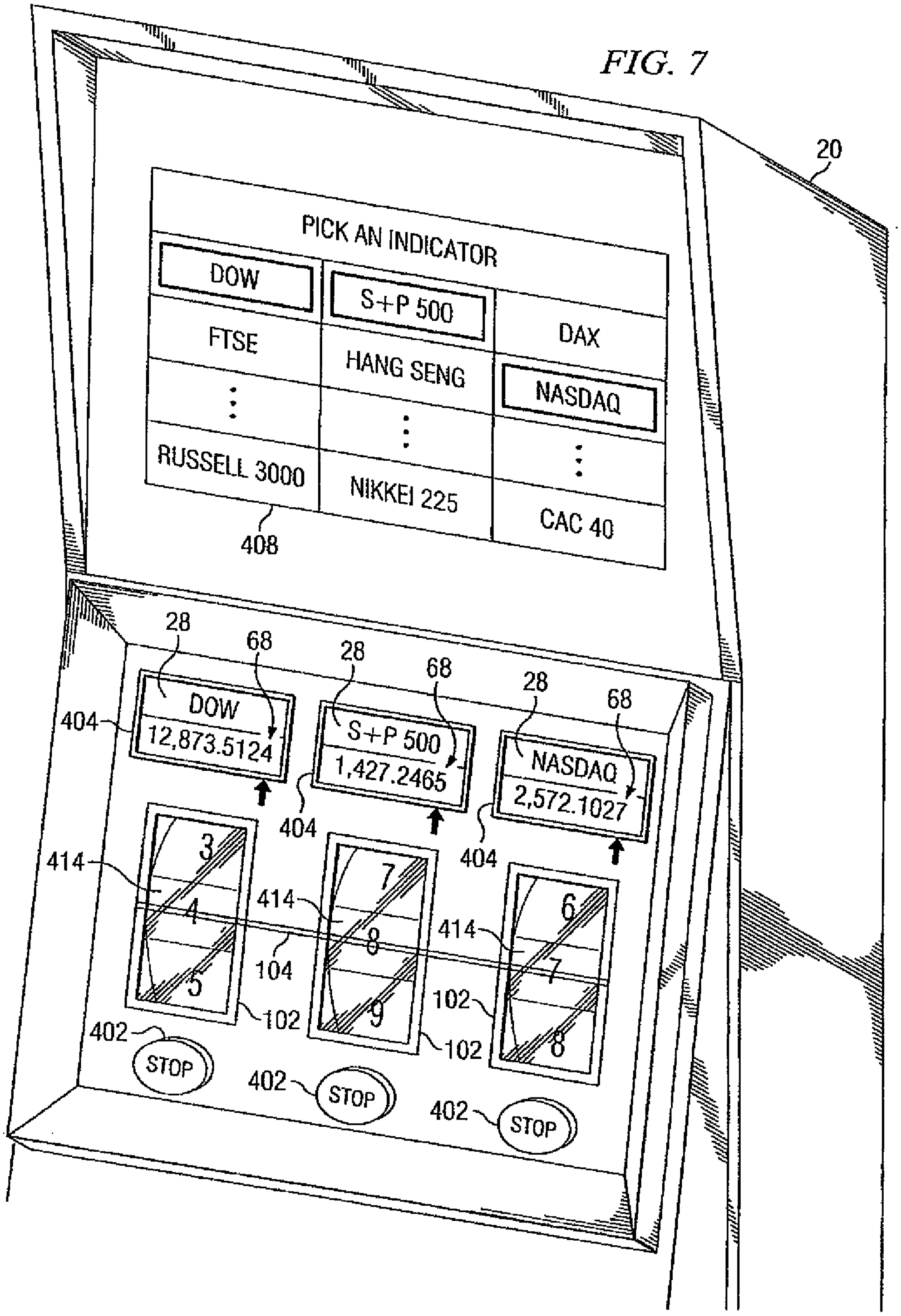
FIG. 7 illustrates a client that provides a slot machine game in which one or more stop buttons correspond to reels that spin independently of financial market indicators, according to certain embodiments.

FIG. 7 illustrates client 20 that provides a slot machine game in which one or more stop buttons 402 correspond to reels 102 that spin independently of market indicators 28, according to certain embodiments. Client 20 may comprise a plurality of reels 102, and each reel 102 may comprise a plurality of digits. For example, a particular reel 102 may comprise digits "0" through "9". In response to bet 22, a start command, or actuation of a lever, the reels 102 of client 20 may begin to spin.

In some embodiments, each reel 102 may be associated with a respective indicator frame 404. Each indicator frame 404 may display a corresponding market indicator 28. Client 20 is operable to update market indicator 28 in indicator frame 404 in real time or substantially real time. In some embodiments, a particular decimal or integral place of market indicator 28 in indicator frame 404 may be designated as input value 68. For example, in the illustrated embodiment, the fourth decimal place in indicator frame 404 is designated as input value 68. It should be understood, however, that any suitable digit of market indicator 28 (e.g., the tens place, the first decimal place, etc.) may be designated as input value 68.

In some embodiments, reels 102 of client 20 may spin independently of market indicators 28 in indicator frames 404. Thus, the particular digit on reel 102 that is displayed at payline 104 may or may not be the same as input value 68 from the corresponding market indicator 28.

In some embodiments, each reel 102 of client 20 may correspond to a respective stop button 402. When a user actuates a particular stop button 402, client 20 may (i) stop the corresponding reel 102 and (ii) freeze the value of market indicator 28 in the corresponding indicator frame 404. To freeze the value of market indicator 28, client 20 may stop updating the displayed value of market indicator 28. When stop button 402 is actuated and reel 102 is stopped, the digit on reel 102 that is positioned at payline 104 may be referred to as stop value 414. System 10 may compare stop value 414 of a particular reel 102 with input value 68 from the corresponding market indicator 28, which has been frozen. In some embodiments, if stop value 414 from the stopped reel 102 is the same as input value 68 from market indicator 28, then reel 102 may be considered a winning reel 102. According to certain embodiments, the payout for bet 22 may be based at least in part on the number of winning reels 102.

An example illustrates certain embodiments. Client 20 displays three reels 102. Each reel 102 comprises the digits "0" through "9". At the start of the game, the user selects three market indicators 28 from indicator table 408. In this example, the user selects the DJIA, the S&P 500, and the NASDAQ. Accordingly, client 20 displays the current value of the DJIA in the first indicator frame 404, the current value of the S&P 500 in the second indicator frame 404, and the current value of the NASDAQ in the third indicator frame 404. Client 20 may update the displayed values of market indicators 28 in real time or substantially real time. In this example, the fourth decimal place of each market indicator 28 is designated as input value 68.

In this example, after selecting the three market indicators 28, the user inputs a start command that causes reels 102 to start spinning. As reels 102 are spinning, client 20 updates indicator frames 404 at any suitable rate (e.g., ten times per second, twenty times per second, etc.).

While reels 102 are spinning, the user actuates stop button 402 associated with the first reel 102 (i.e., the particular reel 102 associated with the DJIA). Upon detecting the actuation of stop button 402, client 20 (i) stops the first reel 102 and (ii) freezes the current value of the DJIA displayed in the first indicator frame 404. In this example, the first reel 102 is stopped such that stop value 414 (i.e., digit displayed at payline 104) is four. In this example, at the moment the user actuates stop button 402, client 20 freezes the current value of the DJIA in indicator frame 404, which is 12,873.5124. Accordingly, input value 68 from the first indicator frame 404 is four (i.e., digit in the fourth decimal place). Because input value 68 and stop value 414 are the same, client 20 determines that the first reel 102 is a winning reel 102.

The user then actuates stop button 402 associated with the second reel 102 (i.e., the particular reel 102 associated with the S&P 500). Upon detecting the actuation of stop button 402, client 20 (i) stops the second reel 102 and (ii) freezes the current value of the S&P 500 displayed in the second indicator frame 404. In this example, the second reel 102 is stopped such that stop value 414 is eight. In this example, at the moment the user actuates stop button 402, client 20 freezes the current value of the S&P 500 in indicator frame 404, which is 1,427.2465. Accordingly, input value 68 from the second indicator frame 404 is five (i.e., digit in the fourth decimal place). Because stop value 414 from the second reel 102 (i.e., eight) is not the same as input value 68 from the second indicator frame 404 (i.e., five), client 20 determines that the second reel 102 is not a winning reel 102.

The user then actuates stop button 402 associated with the third reel 102 (i.e., the particular reel 102 associated with the NASDAQ). Upon detecting the actuation of stop button 402, client 20 (i) stops the third reel 102 and (ii) freezes the current value of the NASDAQ displayed in the third indicator frame 404. In this example, the third reel 102 is stopped such that stop value 414 is seven. In this example, at the moment the user actuates stop button 402, client 20 freezes the current value of the NASDAQ in indicator frame 404, which is 2,572.1027. Accordingly, input value 68 from the third indicator frame 404 is seven (i.e., the digit in the fourth decimal place). Because stop value 414 from the third reel 102 is the same as input value 68 from the third indicator frame 404, client 20 determines that the third reel 102 is a winning reel 102. Thus, in this example, client 20 determines that the first and third reels 102 are winning reels 102. Client 20 may provide an appropriate payout according to any suitable payout table associated with client 20.

In the foregoing example, the DJIA, S&P 500, and NASDAQ are the selected market indicators 28. It should be understood, however, that client 20 may display any suitable number and combination of market indicators 28.

In the foregoing example, input value 68 is the fourth decimal place of market indicator 28. It should be understood, however, that input value 68 may be any suitable decimal or integral place of market indicator 28. It should be further understood that input value 68 for a first market indicator 28 may be associated with a different decimal or integral place than input value 68 for a second market indicator 28. It should also be understood that an indicator need not include a typical decimal number, but rather may include a binary number, a symbol, a direction of movement of prices, etc.

In the foregoing example, client 20 comprises a respective stop button 402 for each reel 102. In other embodiments, client 20 may comprise a single stop button 402. In some embodiments, a first actuation of a particular stop button 402 may stop the first reel 102, a subsequent actuation of the particular stop button 402 may stop the second reel 102, and so forth. In other embodiments, a single actuation of a single stop button 402 may stop all reels 102.

In some embodiments, system 10 may provide various advantages. In particular, system 10 may provide a slot machine game that is associated with one or more market indicators 28. In some embodiments, the slot machine game includes one or more stop buttons 402. By allowing a user to use stop buttons 402, system 10 may give a user the perception that the user's skill or reaction time may affect the outcome of the game. In some embodiments, this perception may be illusory such as, for example, where client 20 updates the value of market indicators 28 at a rate that is faster than typical human reaction time. Nevertheless, this perception may enhance the user's enjoyment of the game.

In some embodiments, possible collusion and/or attempts to influence a market indicator may be monitored and/or prevented. For example, financial transactions associated with a player may be prevented during play, if a player wins a large enough amount of money, the financial trades which that player made may be examined to determine if any trades were made that might have affected the outcome of a game.

Figure 8:
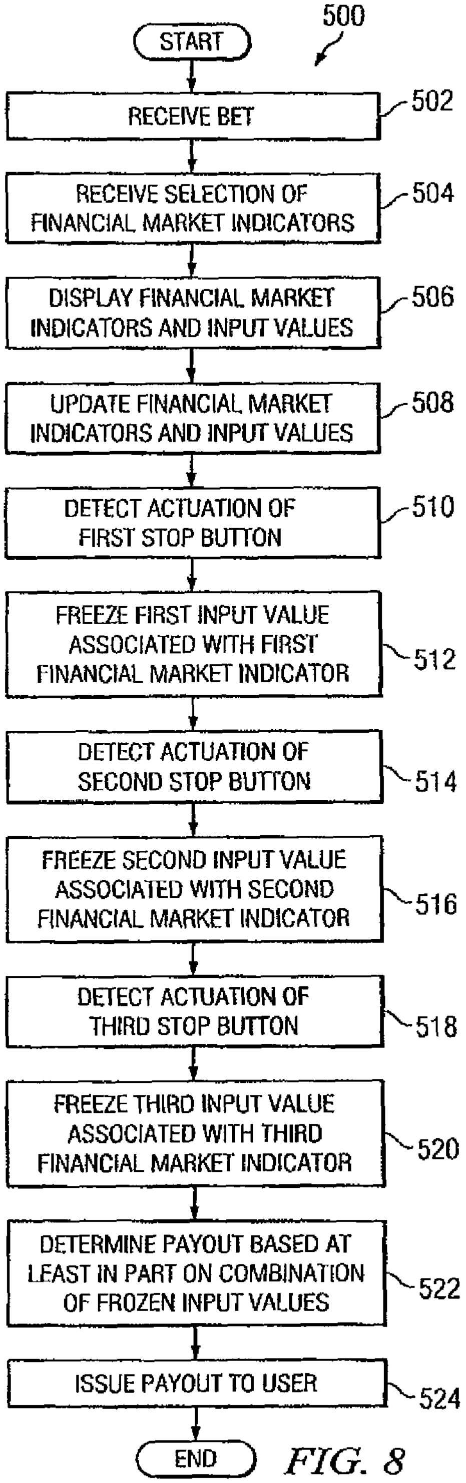
FIG. 8 illustrates a method for a slot machine game that is associated with financial market indicators and that includes one or more stop buttons, according to certain embodiments.

FIG. 8 illustrates a flowchart 500 for a slot machine game that is associated with market indicators 28 and that includes one or more stop buttons 402, according to certain embodiments. The method begins at step 502 where client 20 receives bet 22 regarding a slot machine game. In some embodiments, bet 22 specifies the decimal or integral place of each market indicator 28 that will be used to determine input values 68.

At step 504, client 20 prompts the user to select one or more market indicators 28 from indicator table 408. At step 506, client 20 displays the selected market indicators 28 in respective indicator frames 404. In particular, client 20 may display in a first indicator frame 404 the current value of the first selected market indicator 28. Client 20 may display in a second indicator frame 404 the current value of the second selected market indicator 28, and client 20 may display in a third indicator frame 404 the current value of the third selected market indicator 28.

In conjunction with displaying the selected market indicators 28, client 20 may display input values 68 in respective input frames 406. For a particular input frame 406, client 20 may determine input value 68 from a particular decimal or integral place of the corresponding market indicator 28.

At step 508, client 20 may update, in real time or substantially real time, market indicators 28 displayed in the respective indicator frames 404 and input values 68 displayed in the respective input frames 406. In particular, client 20 may update market indicator 28 in indicator frame 404 in response to changing market conditions as reported by data sources 60. Client 20 may update market indicator 28 according to any suitable rate (e.g., twenty times per second, five times per second, etc.). Thus, as market activity causes the value of market indicator 28 to change, client 20 may display to the user the changing value of market indicator 28 in indicator frame 404.

In conjunction with updating market indicator 28 in indicator frame 404, client 20 may update input value 68 in the corresponding input frame 406. Input value 68 may be determined from a predetermined decimal or integral place of market indicator 28. Thus, as the value of market indicator 28 in indicator frame 404 changes, client 20 may update the corresponding input frame 406 to display the current digit from the predetermined decimal or integral place of market indicator 28.

At step 510, client 20 detects, at a first point in time, actuation of a first stop button 402 associated with the first input frame 406. In some embodiments, actuation of stop button 402 causes client 20 to receive a stop command. At step 512, client 20 freezes input value 68 in the first input fame. Thus, input value 68 may be frozen upon actuation of the first stop button 402 at the first point in time.

At step 514, client 20 detects, at a second point in time, actuation of a second stop button 402 associated with the second input frame 406. At step 516, client 20 freezes input value 68 in the second input frame 406. At step 518, client 20 detects, at a third point in time, actuation of a third stop button 402 associated with the third input frame 406. At step 520, client 20 freezes input value 68 in the third input frame 406.

At step 522, client 20 determines a payout for the received bet 22 based at least in part on the combination of the frozen input value 68 from the first input frame 406, the frozen input value 68 from the second input frame 406, and the frozen input value 68 from the third input frame 406. In some embodiments, rules 66 associated with client 20 may specify a respective payout for different combinations of input values 68 such as, for example, three-of-a-kind, two-of-a-kind, straight, all even digits, all odd digits, and/or any suitable type of combination. At step 524, client 20 issues the determined payout to the user. The method then ends.

It should be understood that in alternative embodiments, the present invention contemplates using methods with additional steps, fewer steps, different steps, or steps in different sequential order so long as the steps remain appropriate for wagering based on financial market indicators.

Slot Machine Game Associated With Market Line Wager

Figure 9:
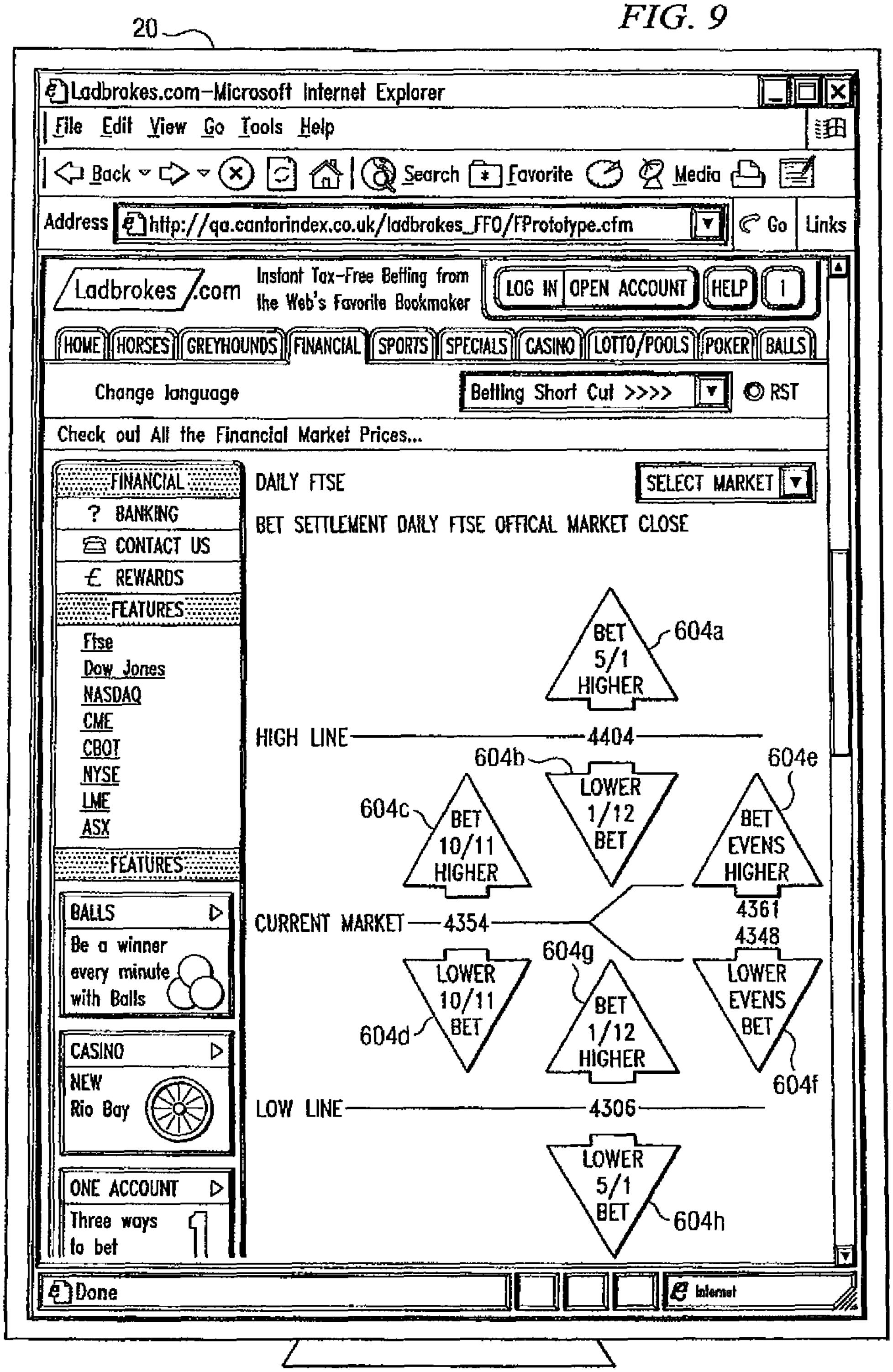
FIG. 9 illustrates a client that provides wagering opportunities associated with moving market indicators, according to certain embodiments.

FIG. 9 illustrates client 20 that provides wagering opportunities associated with moving market indicator 28, according to certain embodiments. Client 20 may provide an opportunity for a user to wager on whether a selected market indicator 28 will be above or below defined market levels after a configurable time period 606. This type of wager may be referred to as a market line wager 602. The associated time period 606 can be variable. For example, market line wager 602 may be that market indicator 28 will be above or below a particular market line after five minutes, ten minutes, at the close of trading, and/or after any suitable time period 606. Thus, market line wager 602 may be an over-under wager associated with a defined market line.

In the illustrated example, client 20 offers eight propositions associated with a particular market indicator 28—namely, the FTSE. Proposition may refer to an opportunity to bet on some attribute or event associated with and/or derived from market indicator 28. In some embodiments, the eight available propositions are based on an opportunity to wager that the FTSE will close above or below four separately defined levels. A list allows a user to access any given exchange in order to place market line wager 602 associated with a given market indicator 28.

In an example embodiment, client 20 displays a high line, the current market line, and a low line for the FTSE. The high line is a constantly moving market level—about 1% of the market value above the current market level in this example. Note that in more volatile markets (or based on particular needs), such high and low lines may be ± any suitable percentage level of the current market line. The high line in this example is at 4404. The higher and lower betting opportunities may represent constant fixed odds prices. The higher odds may be odds against the current levels (a short position) and the lower odds may be odds for (supporting) current levels (a long position or "odds-on"). Thus, in an example arrangement, a set of propositions (604*a* and 604*b*) reflect the short and long positions for the high line. Proposition 604*a* includes odds of 5/1, while proposition 604*b* includes odds of 1/12. In some embodiments, the odds and/or level of lines may change based on conditions of the market.

In some embodiments, after a bet on a market line is placed, on offsetting purchase of a financial instrument may be made. For example, if a bet is placed that an index fund will decrease in value by 50% in the next day at 12/1 odds, a purchase of an inverse exchange traded fund that is leveraged at a 12 to 1 ratio may be made. Accordingly, if the bet wins, the ETF may be sold and the proceeds used to pay the winnings of the bet. If the bet loses, the ETF may be kept or sold and added to assets of a operator of a machine.

The current market line is moving constantly as a reflection of the actual level of market indicator 28. This is in relation to the higher or lower betting opportunities, which may remain at static fixed odds prices (approximately 10/11 in this example). The current market line is 4354 and includes a set of propositions (604*c* and 604*d*), which represent higher and lower positions that are both accompanied by 10/11 odds. Additionally, another set of propositions (604*e* and 604*f*) may be provided at derivations of the current market line. These two propositions may be offered at levels of 4361 and 4348, respectively. Thus, a second current market level (in this case where customers can bet at even money) is provided and offers an opportunity to bet on whether market indicator 28 will expire above or below a market spread. In this example, a thirteen point spread straddles the current market middle line and offers yet another betting opportunity for a user.

In some embodiments, client 20 may display a low line. This represents a constantly moving market level that will be about 1% (in this example) of the market value below the current market. The higher and lower betting opportunities reflect constant fixed odds prices in this example. The higher odds will be (long) odds-on and the lower odds will be (short) odds-against. Thus, a set of propositions (604*g* and 604*h*) are again provided, reflecting the higher and lower propositions, respectively. The odds are 1/12 and 5/1 respectively for propositions 604*g* and 604*h*. Other expiries may also be accommodated and inclusive of intraday markets, weekend markets, and monthly and/or quarterly expirations.

The high line and low line, in addition to reflecting market movements, may move over time. The spread between the high line and the market line may grow more narrow (or closer) as the expiry draws near. This is also true for the higher evens proposition 604*e* and the lower evens proposition 604*f*. Thus, such lines may be floating: not only in the sense of market movements, but also as time progresses they will move and narrow. For example, with five minutes left to go for a wager, these lines may be quite narrow. Thus, the high line generally comes down (while odds remain relatively consistent) and the low line generally goes up during the course of the trading day. Note also that over time, as the expiration of time period 606 nears, certain propositions may be eliminated because of practical constraints. Markets generally move in whole number increments. Therefore, spreads that are too narrow will eliminate certain propositions (e.g. 604*b* and 604*g*), as time period 606 expires. This offers some constraint on such a scenario, whereby (for example) the high line and the low line cannot be any closer than five or ten ticks apart.

The propositions with 1/12 and 5/1 odds (propositions 604*b*, 604*g*, 604*a*, and 604*h*) reflect odds calculations that are determined based on their corresponding lines (i.e. 4404 and 4306). Thus, in an example market line wager 602, consider the case where a user bets S100 that the FTSE will be above the high line (provided as 4404) when time period 606 expires. This proposition provides 5/1 odds (identified as proposition 604*a*). When time period 606 expires, assume the FTSE is at 4425. The user's market line wager 602 is a winning bet 22. Settlement would then ensue where the user would collect S500 from the winning bet 22 plus his original stake, which would yield S600 total. Using the same parameters, consider a second user that opts to wager on the lower proposition. The lower proposition offers 1/12 odds (identified as proposition 604*b*). If market indicator 28 is above such a prediction when time period 606 expires, the second user would lose the 100 that he wagered. If, on the other hand, the FTSE is at 4390 when time period 606 expires, the second user would be rewarded with S100/12 (the odds offered) plus his original stake. This would yield a return of approximately S108.33 for the winning bet 22.

As described above, the price that is being offered to a user, reflecting where the middle of the market is, can be provided by a communications feed from data sources 60. This feed could reflect daily market conditions and effectively encompass news flow and other financial parameters that could potentially affect the market. Other embodiments, described more fully below, offer an owner or operator of system 10 considerable flexibility in setting market lines and odds.

In some embodiments, processor 42 is operable to establish a number of odds for a user in the context of a number of wagering opportunities. Processor 42 may transmit the established odds to client 20, which may display the established odds to a user. In one embodiment, processor determines the odds for a particular proposition based at least in part on three factors: underlying market level, volatilities, and time. Volatility represents a measure of uncertainty exhibited by the market over a given time period 606. Markets generally follow log-normal distribution, which reflects an abstraction or theory that allows a person to reasonably approximate market movements. In this sense, the mathematics used to calculate odds could be similar to that of options pricing. In other scenarios, odds calculations may be based on exposure for an owner/operator of system 10. Note that a number of control parameters are provided to an administrator of system 10. For example, the volatility factor may be manipulated in response to breaking news that would most likely affect market levels. This judgment may be made by an administrator and reflect his or her own judgment and/or expertise in market theories. In other scenarios, such news items would automatically be priced into the financial market.

In an alternative embodiment, processor 42 determines odds for a particular proposition based on the following formula: odds=(prize value/risk value)*factor. Therefore, odds could be variable based (at least in part) on the prize value and the risk value. In still other embodiments, processor 42 may use or consider any number of influential factors to vary odds that are offered to users. Any number of news items, statistical data, or events, may affect or influence a given market. These factors may be taken into consideration by processor 42 and/or an administrator in setting odds. Such factors may include market news or commentary, job data, interest rate information, commodity prices, consumer spending, consumer confidence, unemployment information, economic growth, capital spending, gross domestic product (GDP) data, bond prices, or any other piece of information or data that may have an influential effect on a given market line. For example, a decrease in interest rates generally spawns an increase in the Dow Jones Industrial Average (DJIA) for that trading day. Processor 42 may calculate odds in a systematic manner (as described herein) and then factor in this information such that the odds are generally shifted to accommodate for the probability of gains in that day's market performance. In other embodiments, such information is built into the market line in a manner that is suitable to an administrator and, therefore, such manipulations are unnecessary.

In an example scenario, consider that the S&P 500 rarely performs poorly in an election year in the United States. Only twice in the history of the U.S. stock markets has the S&P 500 provided a negative return for investors during an election year. Thus, during an election year, control parameters may be implemented to reflect the conclusion that, over the course of the year, the S&P 500 is most likely to rise. Similarly, markets tend to decline in times of war or during patterns of interest rate increases. In the event of a major war or in the event that such a pattern of systematic interest rate increases is identified, an administrator could again manipulate the odds (as he or she sees fit) to reflect this probable downward trend.

Note that in other scenarios, the market line may be static or fixed over a given time period 606, whereby the odds may be varied in order to tempt a user or to solicit additional betting. For example, if the FTSE shoots up 300 points to a level of 5000 in morning trading, the odds can be varied significantly (e.g. 50/1 or 100/1) in order to entice people to bet that the FTSE will close below the original market line. This is an unlikely occurrence. Other unlikely occurrences (involving the appreciation or depreciation of corresponding markets) may be readily appreciated and are, thus, clearly within the scope of the teachings of system 10.

Figure 10:
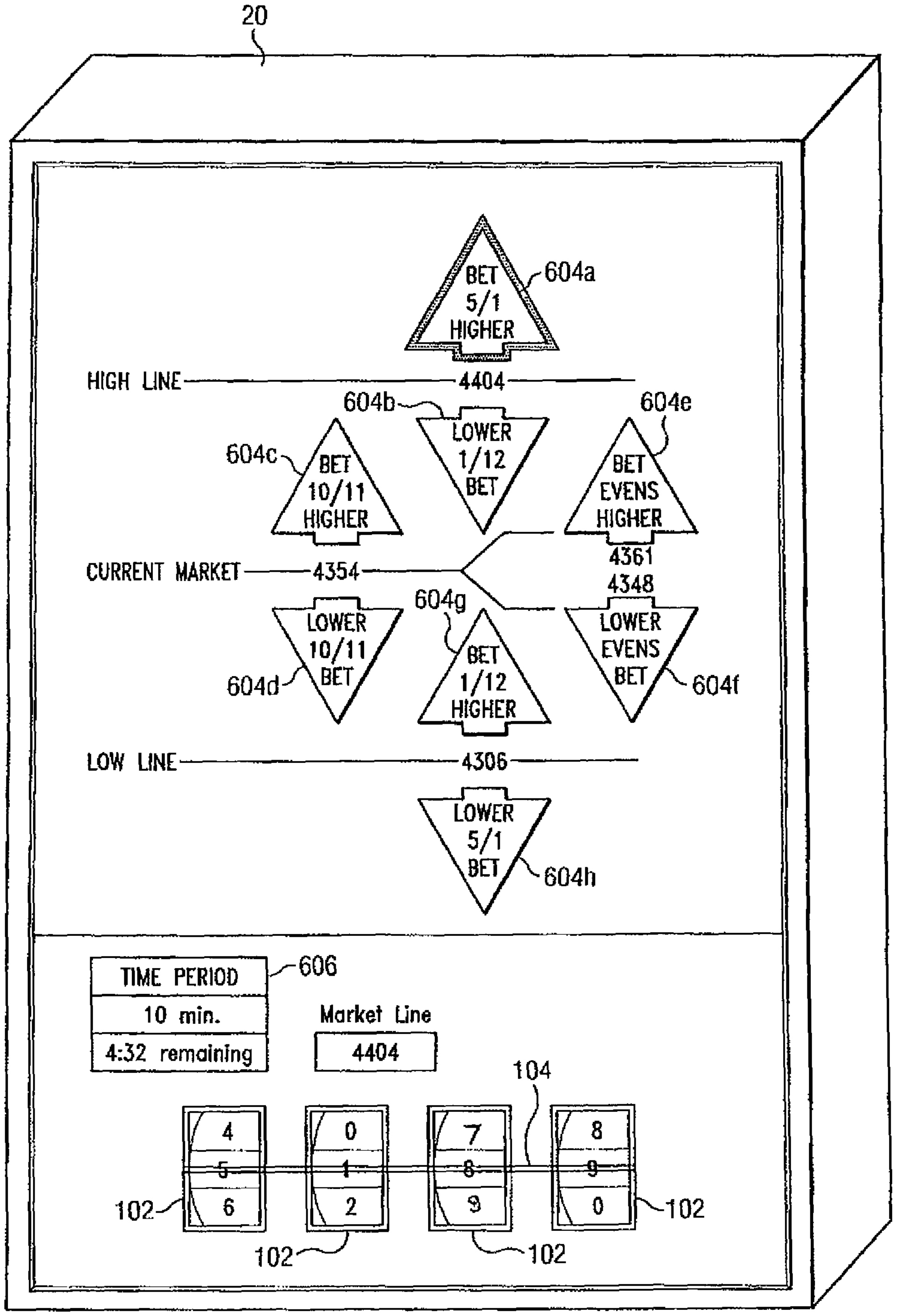
FIG. 10 illustrates a client that provides a slot machine game that is generally associated with market line wagers, according to certain embodiments.

While a user that placed market line wager 602 waits for time period 606 to expire (so that the outcome of market line wager 602 may be determined), system 10 may offer to the user other betting opportunities such as, for example, a slot machine game. FIG. 10 illustrates client 20 that provides a slot machine game that is generally associated with market line wagers 602, according to certain embodiments. In particular, client 20 may display propositions associated with a high line, a current market line, and a low line. In some embodiments, client 20 displays time period 606 associated with propositions (e.g., five minutes, ten minutes, end-of-day). The outcome of market line wager 602 may depend on the value of market indicator 28 when time period 606 expires. As explained above, a user may place market line wager 602 by selecting at least one of the displayed propositions. For example, a user may place a market line wager 602 by selecting the high line arrow for "Bet 5/1 Higher". Client 20 may then display the value of high line from the moment the user made the selection. User may then wait until time period 606 expires. When time period 606 expires in this example, if market indicator 28 is greater than the value of high line (from when the user made the selection), then market line wager 602 is a winning wager.

In some embodiments, while the user waits for time period 606 associated with market line wager 602 to expire (so the outcome of market line wager 602 may be determined), client 20 may provide a slot machine game that is associated with market line wager 602. In particular, client 20 may display one or more reels 102. Client 20 may submit a slot bet 22 in order to spin reels 102. The reels 102 may come to a stop such that one or more symbols 106 or characters are displayed. The outcome of the slot bet 22 may be based at least in part on the displayed symbols 106 on reels 102 and the value of market line associated with market line wager 602.

An example illustrates various embodiments. Assume client 20 displays a high line, a current market line, and a low line associated with the FTSE. Client 20 displays a plurality of propositions. Each proposition represents an opportunity to wager that, when time period 606 expires, market indicator 28 will be above or below the corresponding market line. For example, client 20 may display a first proposition with 5/1 odds that market indicator 28 will be higher than the high line when time period 606 expires. Client 20 may further display a second proposition with 1/12 odds that market indicator 28 will be lower than the high line when time period 606 expires. In this example, a user selects the first proposition (i.e., the 5/1 proposition that market indicator 28 will be higher than the high line when time period 606 expires). When the user selects the first proposition, the value of the high line is 4404. Accordingly, the market line wager 602 of user is that market indicator 28 will be above 4404 when time period 606 expires.

In this example, while the user waits for time period 606 to expire, the user plays a slot machine game offered by client 20. In this example, client 20 displays four reels 102. In association with reels 102, client 20 displays the value of high line as of the moment the user placed market line wager 602. In this example, each reel 102 comprises the digits "0" through "9" and each reel 102 corresponds to a respective digit of the displayed value of high line. To play the slot machine game, the user places a slot bet 22 and spins reels 102. In this example, reels 102 come to a stop after a configurable period of time and/or after user actuates one or more stop buttons 402. The stopping point for each reel 102 may be determined randomly (e.g., by a random number generator) or according to non-random, unpredictable events (e.g., the values of respective market indicators 28, as explained above with respect to FIGS. 1-8). When reels 102 come to a stop, each reel 102 displays a respective digit at payline 104. In this example, the first reel 102 comes to a stop such that the digit "5" is displayed, the second reel 102 comes to a stop such that the digit "1" is displayed, the third reel 102 comes to a stop such that the digit "8" is displayed, and the fourth reel 102 comes to a stop such that the digit "9" is displayed. Thus, the displayed digits form the number "5189".

In this example, client 20 determines whether a slot bet 22 is a winning bet 22 according to the following rules:

1) If market line wager 602 is that market indicator 28 will finish higher than the value of the selected market line, then the slot bet 22 is a winning bet 22 if the number formed by the displayed digits of reels 102 is higher than the value of the selected market line.
2) If market line wager 602 is that market indicator 28 will finish lower than the value of the selected market line, then the slot bet 22 is a winning bet 22 if the number formed by the displayed digits of reels 102 is lower than the value of the selected market line.

In this example, market line wager 602 of user is that market indicator 28 will be higher than 4404 when time period 606 expires. Thus, according to the first rule, client 20 determines that the slot bet 22 is a winning bet 22 because the number from reels 102 (i.e., 5189) is higher than 4404.

Processor 42 may determine payout 72 for the slot bet 22 according to any suitable rules. In particular, payout 72 may based at least in part on the value of the selected market line, the probabilities associated with various reel 102 combinations, one or more takeout criteria, and/or any suitable criteria. In some embodiments, if market indicator 28 equals the selected market line when time period 606 expires, then the outcome of slot bet 22 may be a push or may be in favor of the user or of "the house."

In the foregoing example, client 20 displays a respective reel 102 for each digit from the selected market line. In other embodiments, client 20 may display a single reel 102. For example, client 20 may display a single reel 102—actual or virtual—that comprises the numbers "0" to "9999". In such embodiments, the outcome of a slot bet 22 may be based at least in part on the number displayed by the single reel 102 when it comes to a stop. For example, if market line wager 602 is that market indicator 28 will be higher than 4404 when time period 606 expires, then a slot bet 22 may be a winning bet 22 if the single wheel stops and displays a number that is higher than 4404.

In the foregoing example, the rules for determining the outcome of a slot bet 22 correspond to the type of proposition selected for market line wager 602. For example, if market line wager 602 is that market indicator 28 will be higher than a particular market line when time period 606 expires, then the slot bet 22 is a winning bet if the number from reel(s) 102 is higher than the particular market line. In other embodiments, however, the rules for determining the outcome of a slot bet 22 may inversely related to the type of proposition selected for market line wager 602. For example, if market line wager 602 is that market indicator 28 will be higher than a particular market line when time period 606 expires, then the slot bet 22 is a winning bet 22 if the number from reel(s) 102 is lower than the particular market line.

According to certain embodiments, client 20 may provide a slot machine game in which digits from reels 102 are summed or multiplied to determine outcome of a slot bet 22. For example, assume market line wager 602 is that market indicator 28 will be higher than 4404 when time period 606 expires. In this example, client 20 may display four reels 102 wherein each reel 102 comprises the numbers "0" to "2500". While a user waits for the outcome of market line wager 602 to be determined, the user may submit a slot bet 22 and spin the four reels 102 displayed by client 20. In this example, the four reels 102 come to a stop such that the first reel 102 displays the number "2268", the second reel 102 displays the number "782", the third reels 102 displays the number "1072", and the fourth reel 102 displays the number "173". Thus, the sum of the displayed numbers is 4295 (i.e., 2268+782+1072+173).

In this example, client 20 determines whether a slot bet 22 is a winning bet 22 according to the following rules:

1) If market line wager 602 is that market indicator 28 will finish higher than the value of the selected market line, then the slot bet 22 is a winning bet 22 if the sum of the displayed numbers from reels 102 is higher than the value of the selected market line.
2) If market line wager 602 is that market indicator 28 will finish lower than the value of the selected market line, then the slot bet 22 is a winning bet 22 if the displayed numbers from reels 102 is lower than the value of the selected market line.

In this example, market line wager 602 is that market indicator 28 will be higher than 4404 when time period 606 expires. Thus, according to the first rule, client 20 determines that the slot bet 22 is a losing bet 22 because the sum of the displayed numbers from reels 102 (i.e., 4295) is not higher than 4404.

In the foregoing examples, reels 102 comprise digits. In other embodiments, reels 102 may comprise symbols 106, as illustrated in FIG. 4. In some embodiments, client 20 may map symbols 106 from reels 102 to digits (or vice versa) according to any suitable symbol/digit matrix to determine whether a slot bet 22 is a winning bet 22.

In the foregoing example, propositions and the slot machine game are associated with the FTSE. It should be understood, however, that propositions and the slot machine game may be associated with any suitable type and combination of market indicator 28.

Although the foregoing examples illustrate particular functions being performed by client 20, it should be understood that some or all or the functions performed by client 20 may be performed by processor 42. It should be further understood that some or all or the functions performed by processor 42 may be performed by client 20.

Figure 11:
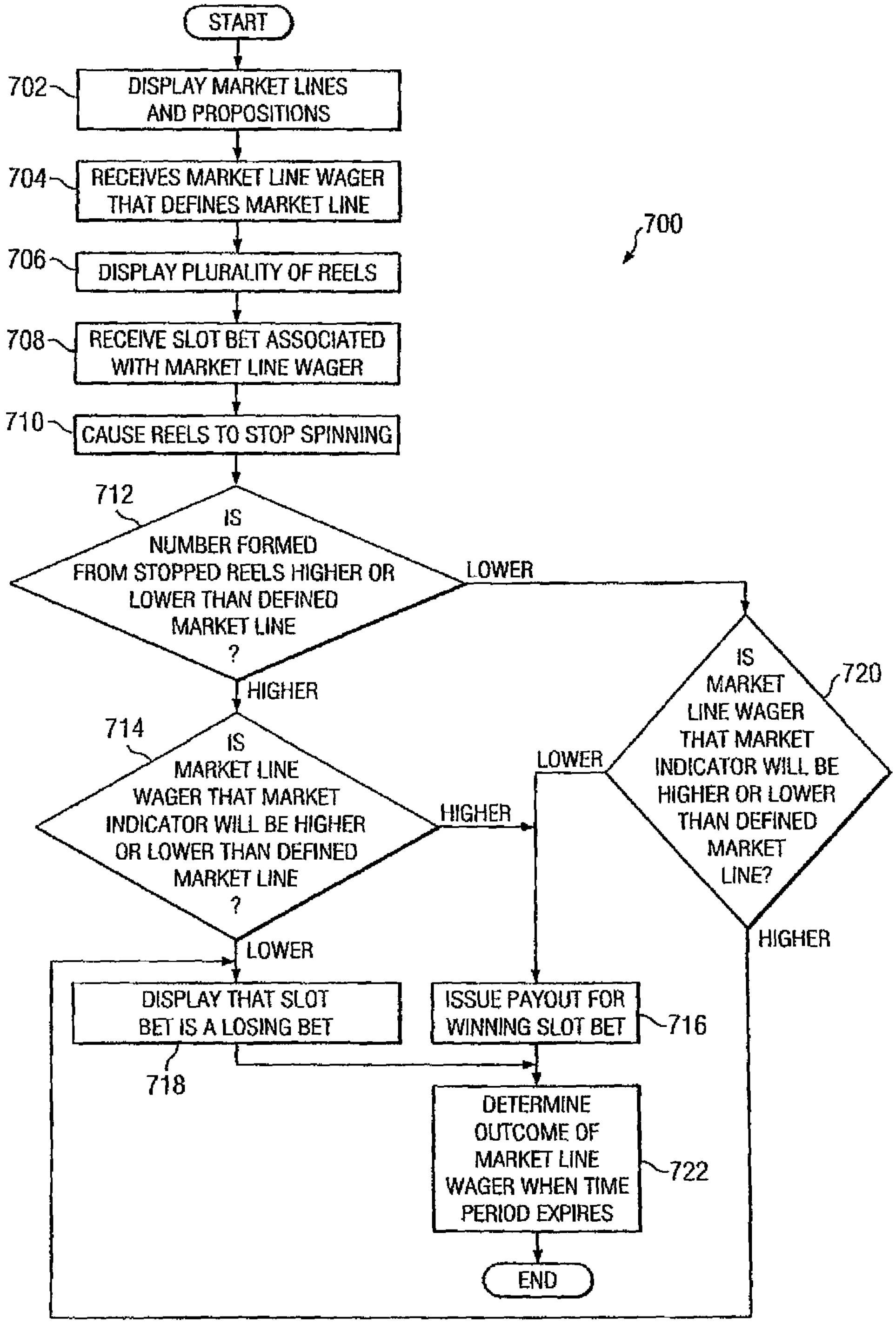
FIG. 11 illustrates a flowchart for managing a slot machine game associated with market line wagers, according to certain embodiments.

FIG. 11 illustrates a flowchart 700 for managing a slot machine game associated with market line wager 602, according to certain embodiments. The method begins at step 702 where client 20 displays one or more market lines and one or more propositions associated with the displayed market lines. A particular proposition may indicate odds that market indicator 28 will be above or below a corresponding market line when a configurable time period 606 expires. In some embodiments, the indicated odds are fixed odds and the displayed market lines are constantly moving based at least in part on changing market conditions.

At step 704, client 20 receives market line wager 602 associated with a displayed value of a particular market line. At step 706, client 20 displays a plurality of reels 102. In some embodiments, the perimeter of each reel 102 comprises a plurality of digits. Each reel 102 may correspond to a respective digit of the displayed value of the particular market line. At step 708, client 20 receives a slot bet 22 associated with market line wager 602. In some embodiments, in response to receiving the slot bet 22, client 20 causes reels 102 to begin spinning. At step 710, client 20 causes the displayed reels 102 to stop spinning such that each stopped reel 102 displays a respective digit. At step 712, client 20 determines whether the number formed by the stopped reels 102 is higher or lower than the market line corresponding to market line wager 602.

If client 20 determines at step 712 that the number formed by the stopped reels 102 is higher than the particular market line corresponding to market line wager 602, then at step 714 client 20 determines whether market line wager 602 is that market indicator 28 will be higher or lower than the particular market line. If client 20 determines at step 714 that market line wager 602 is that market indicator 28 will be higher than the particular market line, then at step 716 client 20 may issue payout 72 for the winning slot bet 22. If, however, client 20 determines at step 714 that market line wager 602 is that market indicator 28 will be lower than the particular market line, then at step 718 client 20 may display that the slot bet 22 is a losing bet 22.

If client 20 determines at step 712 that the number formed by the stopped reels 102 is lower than the particular market line corresponding to market line wager 602, then at step 720 client 20 determines whether market line wager 602 is that market indicator 28 will be higher or lower than the particular market line. If client 20 determines at step 720 that market line wager 602 is that market indicator 28 will be lower than the particular market line, then at step 716 client 20 may issue payout 72 for winning slot bet 22. If, however, client 20 determines at step 720 that market line wager 602 is that market indicator 28 will be higher than the particular market line, then at step 718 client 20 may display that the slot bet 22 is a losing bet 22. At step 722, client 20 determines outcome of market line wager 602 based at least in part on the value of market indicator 28 when time period 606 expires. The method then ends.

Although embodiments of the invention and their advantages are described in detail, a person skilled in the art could make various alterations, additions, and omissions without departing from the spirit and scope of the present invention as defined by the appended claims.

Although some embodiments have been described with respect to slot machine implementations, it will be readily understood that other embodiments could include versions of any other game of skill and/or chance involving one or more players (e.g., card type games, roulette type games, games involving competition between multiple players, etc.)

Some aspects include a system comprising a memory having stored thereon a plurality of instructions configured to cause the system to cause a user interface to display a value of a first financial market indicator, receive a first stop command at a first time, in response to receiving the first stop command, determine a first element from the value of the first financial market indicator at the first time, determine a second element from a value of a second financial market indicator, and determine an outcome of a wager based at least in part on the determined first element and the determined second element.

In some embodiments, the value of the first financial market indicator is displayed in associated with a first stop control, and the first stop command is received in response to an actuation of the first stop control. In some embodiments, the plurality of instructions are further configured to cause the system to cause the user interface to display the value of the second financial market indicator, and receive a second stop command at a second time. In some implementations, the determination of the second element is in response to receiving the second stop command; and the second element is determined from the value of the second financial market indicator at the second time. In some implementations, the value of the first financial market indicator is displayed in association with a first stop control, the first stop command is received in response to an actuation of the first stop control, the value of the second financial market indicator is displayed in association with a second stop control, and the second stop command is received in response to an actuation of the second stop control.

In some embodiments, the first financial market indicator is associated with at least one of: the Dow Jones Industrial Average, the NASDAQ, the Financial Times Stock Exchange, and the S&P 500. In some embodiments, the value of the first financial market indicator comprises a plurality of numerical digits, and determining the first element comprises identifying a digit from a predetermined decimal place of the displayed value of the first financial market indicator at the first time. In some embodiments, the wager identifies a wild element, and if the determined first element matches the wild element, then the determined first element is considered to match the determined second element.

In some embodiments, the plurality of instructions are further configured to cause the system to receive a surrender command prior to determining the outcome of the wager, and in response to receiving the surrender command, refund at least a portion of the wager. In some embodiments, the wager is a winning wager if the determined first element matches the determined second element. In some embodiments, the displayed value of the first financial market indicator is updated at a predetermined rate. In some embodiments, the plurality of instructions are further configured to cause the system to cause the user interface to display a spinning reel, and stop the reel after receiving the first stop command. In some embodiments, the reel is caused to stop such that the second element is visible on the reel.

Some aspects include a method of wagering. In some embodiments, the method includes placing a wager on an electronic gaming machine, and operating a first stop control at a first time to cause the electronic gaming machine to determine a first gaming element based on a value of a first financial market indicator associated with the first time, wherein the first element is used to determine at least part of an outcome of the wager.

In some embodiments, the electronic gaming machine includes a slot machine. In some embodiments, the electronic gaming machine is configured to display a value of the first market indicator that is updated at a predetermined rate. In some embodiments, the electronic gaming machine is further configured to display a value of a second market indicator that is updated at a predetermined rate, and wherein the method further comprises operating a second stop control at a second time to cause the electronic gaming machine to determine a second gaming element based on a value of a second market indicator associated with the second time, wherein the second element is used to determine at least part of the outcome of the wager. In some implementations, the wager is a winning wager if the determined first element matches the determined second element.

In some embodiments, the first financial market indicator is associated with at least one of the Dow Jones Industrial Average, the NASDAQ, the Financial Times Stock Exchange, and the S&P 500. In some embodiments, the value of the first financial market indicator comprises a plurality of numerical digits; and wherein determining the first gaming element comprises identifying a digit from a predetermined decimal place of the displayed value of the first financial market indicator at the first time. In some embodiments, the wager identifies a wild element. Some embodiments further comprise entering a surrender command prior to an end of a wager event. In some embodiments, the wager involves the first market indicator and a second market indicator, and the wager is a winning wager if the determined first gaming element matches a determined second gaming element for the second market indicator.

Some aspects include a method of operating a gaming machine. In some embodiments, the method includes providing a representation of a market indicator and a possible future value of the market indicator associated with a future time, receiving a wager placed on the market indicator, the wager corresponding to a comparison between the possible value and the future value, and determining an outcome of the wager based on the possible future value and an actual value of the financial indicator at the future time.

Some embodiments further comprise determining an odds of the wager based at least in part on a distance of the future time from a time the wager is received. Some embodiments further comprise determining an odds of the wager based at least in part on a market trend associated with the market indicator. In some embodiments, the market indicator is associated with at least one of the Dow Jones Industrial Average, the NASDAQ, the Financial Times Stock Exchange, and the S&P 500.

In some embodiments, a distance between the market indicator and the possible future value decreases as a future time becomes closer to a current time. In some embodiments, the comparison identifies that the actual value of the market indicator will be at least one of equal to, greater than, and less than the future value at the future time. In some embodiments, the possible future value includes at least one of a first high line and a first low line. Some implementations further comprise providing a representation of a second possible future value associated with the future time, the second possible future value comprising at least one of a second low line and a second high line.

What is claimed is:

1. A slot machine comprising:

a display panel;

a microphone;

at least one processor to:

render a graphical user interface on a given display panel;

detect entry of a wager via the graphical user interface, the wager comprising a predicted combination of specific digits;

receive a plurality of real-time financial market indicators;

render values of the plurality of real-time financial market indicators on at least one of the display panels;

render, in each respective display panel, real-time updates of the plurality of real-time financial market indicators;

receive a voice command, via the microphone, to freeze the real-time updates;

in response to receiving the voice command, freeze the real-time updates of the plurality of real-time financial market indicators such that final values of the plurality of financial market indicators are rendered on the respective display panels;

determine a result based on a combination of specific digits among the final values of the plurality of financial market indicators, each specific digit being positioned at a particular decimal place of each financial market indicator; and determine a payout of the wager based at least in part on the result.

2. The slot machine of claim 1, wherein the plurality of real-time financial market indicators are associated with at least one of: the Dow Jones Industrial Average; the NASDAQ; the Financial Times Stock Exchange; and the S&P 500.

3. The slot machine of claim 1, wherein the at least one processor determines that the result is a winning result when the combination of specific digits matches the predicted combination of specific digits.

4. The slot machine of claim 1, wherein the at least one processor is further configured to determine that the wager is a winning wager, in response to determining that the result matches a wild element.

5. The slot machine of claim 1, the at least one processor is further configured to receive a surrender command prior to determining an outcome of the wager; and in response to receiving the surrender command, refund at least a portion of the wager.

6. The slot machine of claim 1, wherein the at least one processor is further configured to render the real-time updates at a predetermined rate.

7. The slot machine of claim 1, wherein the at least one processor determines that the wager is a winning wager, in response to determining that the result is identical to another result.

8. A method comprising:

displaying a graphical user interface on a display panel of a slot machine;

detect entry of a wager via the graphical user interface, the wager comprising a predicted combination of specific digits;

receiving from a remote data source, by at least one processor of the slot machine, a plurality of real-time financial market indicators;

rendering values of the plurality of real-time financial market indicators on at least one display panel;

rendering, by the at least one processor, in each respective display panel, real-time updates of the plurality of real-time financial market indicators;

receiving, by the at least one processor, a voice command, via a microphone, to freeze the real-time updates;

in response to receiving the voice command, freezing, by the at least one processor, the real-time updates of the plurality of real-time financial market indicators such that final values of the plurality of financial market indicators are rendered on the respective display panels;

determining, by the at least one processor, a result based on a combination of specific digits among the final values of the plurality of financial market indicators, each specific digit being positioned at a particular decimal place of each financial market indicator; and determining, by the at least one processor, a payout of a wager based at least in part on the result.

9. The method of claim 8, wherein the plurality of real-time financial market indicators are associated with at least one of: the Dow Jones Industrial Average; the NASDAQ; the Financial Times Stock Exchange; and the S&P 500.

10. The method of claim 8, further comprising determining, by the at least one processor, that the result is a winning result when the combination of specific digits matches the predicted combination of specific digits.

11. The method of claim 8, further comprising determining, by the at least one processor, that the wager is a winning wager, in response to determining that the result matches a wild element.

12. The method of claim 8, further comprising:

receiving, by the at least one processor, a surrender command prior to determining an outcome of the wager; and in response to receiving the surrender command, refunding, by the at least one processor, at least a portion of the wager.

13. The method of claim 8, further comprising rendering, by the at least one processor, the real-time updates at a predetermined rate.

* * * * *